United States Patent
Mullendore et al.

(10) Patent No.: US 7,227,841 B2
(45) Date of Patent: Jun. 5, 2007

(54) PACKET INPUT THRESHOLDING FOR RESOURCE DISTRIBUTION IN A NETWORK SWITCH

(75) Inventors: Rodney N. Mullendore, San Jose, CA (US); Stuart F. Oberman, Sunnyvale, CA (US); Anil Mehta, Milpitas, CA (US); Keith Schakel, San Jose, CA (US); Kamran Malik, San Jose, CA (US)

(73) Assignee: Nishan Systems, Inc., Broomfield, CO (US)

( * ) Notice: Subject to any disclaimer, the term of this patent is extended or adjusted under 35 U.S.C. 154(b) by 1123 days.

(21) Appl. No.: 10/144,081

(22) Filed: May 13, 2002

(65) Prior Publication Data
US 2003/0026205 A1    Feb. 6, 2003

Related U.S. Application Data

(60) Provisional application No. 60/308,934, filed on Jul. 31, 2001.

(51) Int. Cl.
*G01R 31/08* (2006.01)
(52) U.S. Cl. .................................................. 370/230
(58) Field of Classification Search .................. None
See application file for complete search history.

(56) References Cited

U.S. PATENT DOCUMENTS

| | | | |
|---|---|---|---|
| 5,592,476 A * | 1/1997 | Calamvokis et al. | 370/390 |
| 5,764,641 A | 6/1998 | Lin | |
| 6,771,652 B1 * | 8/2004 | Aydemir et al. | 370/412 |
| 7,012,919 B1 * | 3/2006 | So et al. | 370/392 |
| 7,058,070 B2 * | 6/2006 | Tran et al. | 370/412 |
| 2002/0131365 A1 | 9/2002 | Barker et al. | |
| 2002/0136211 A1 | 9/2002 | Battle et al. | |

\* cited by examiner

*Primary Examiner*—Doris H. To
*Assistant Examiner*—Thien D. Tran
(74) *Attorney, Agent, or Firm*—Hensley Kim & Edgington, LLC

(57) ABSTRACT

A system and method for input thresholding packets in a network switch. A network switch may include multiple input ports, multiple output ports, and a shared random access memory coupled to the input ports and output ports by data transport logic. Packets entering the network switch may be assigned to one of a plurality of threshold groups and to one of a plurality of flows within the threshold group. In one embodiment, each threshold group may be divided into a plurality of levels of operation. As resources are allocated or freed by the threshold group, the threshold group may dynamically move up or down in the levels of operation. Within each level, one or more different values may be used as level boundaries and resource limits for flows within the threshold group. In one embodiment, programmable registers may be used to store these values.

43 Claims, 17 Drawing Sheets

| Field Name | Size (in bits) | Description |
|---|---|---|
| Queue Count 490A | 5 | This field is the number of output queues that contain this packet. When a packet is received, this field is initially set to the number of output queues on which the packet is inserted. This value is the number of 1 bits (i.e., asserted bits) in the port mask of the flow descriptor (after the source port has been removed from the mask). This field will be decremented as each output queue transmits the packet until the count reaches 0 when the packet (descriptor and cell memory) will be freed. This field may be stored in a separate queue count memory. |
| Cluster Count 490B | 7 | This field stores the number of clusters used by the packet. This is used by the read stored packet Manager to indicate how many clusters are to be freed when a packet is either read out or discarded. |
| Input Flow Number 490C | 10 | This field is used to track resources per flow and to update resources when the packet is freed. |
| Threshold Group / Virtual Channel Number 490D | 5 | This field is used to track resources per threshold group and to update resources when the packet is freed. The MSB (most significant bit) of this field indicates if the lower bits are group or VC (virtual channel) number: 1 = threshold group (4 bits)   0 = VC number (3 bits) |
| Cell List Head 490E | 15 | This field points to the first cell (cluster) of the packet's data. Note a linked list of cells (clusters) holds the packet data. |
| Cell List Tail 490F | 15 | This field points to the last cell (cluster) of the packet's data. Note a linked list of cells (clusters) holds the packet data. |
| Tail Valid 490G | 1 | This field indicates whether the packet has completely been written to memory as of the time that the packet descriptor is written, and thus whether the tail cell pointer is valid. This is used by the read stored packet manager in the case of an early-forwarded packet. |
| Error Detected 490H | 1 | This field indicates whether any error has been detected by the fabric before writing to memory. This bit is the ERR (error) bit of the packet. It is written at the end of a packet, when the Cell List Tail and Tail Valid signals are updated. For multiple cell packets, this bit is cleared on the first write of the packet descriptor. |
| To Be Dropped 490I | 1 | This bit indicates that the packet is to be dropped when it is scheduled. This occurs for packets when resources are depleted after it has already begun to be written to memory. In some embodiments it may be guaranteed that this packet is never early-forwarded, and thus can be dropped when it is started to be read. |
| Source Port 490J | 5 | This field contains the port from which the packet was received. This value is used when a packet is freed to adjust the resource allocation fields in the appropriate input port descriptor. |
| High Priority 490K | 1 | This field indicates if the packet is high priority. If this bit is set, the packet is not subject to thresholding. The packet is only dropped if there are no more "non-VC" (non-virtual channel) resources available. |

*Fig. 2*

Input FIFO Structure

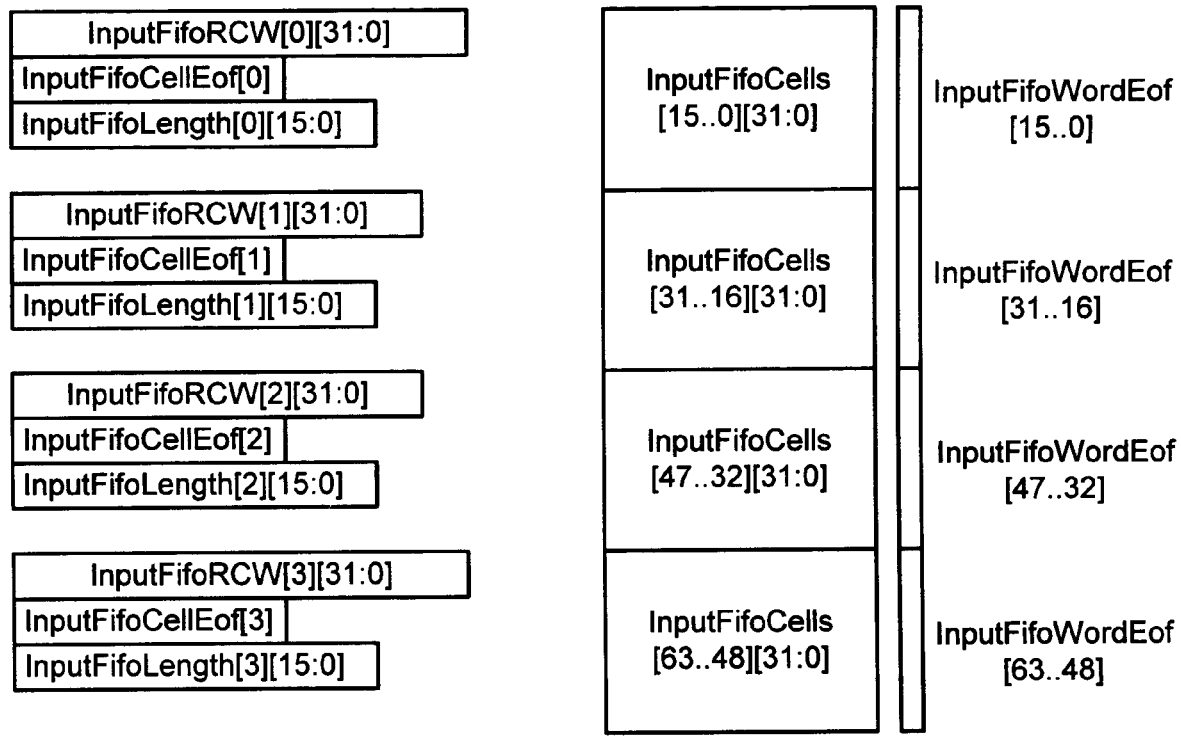

*Fig. 5*

Input FIFO Pointers

| FIFO Pointer | Function |
|---|---|
| HeadCellPtr[1:0] | Points to the current head cell |
| TailCellPtr[1:0] | Points to the current tail cell |
| SavedFirstCellPtr[1:0] | Points to the saved first cell for the currently read packet |
| WriteWordPtr[3:0] | Points to the word within the tail cell that is being written to |
| SfReadWordPtr[3:0] | Points to the word within the head cell that is being read from for store and forward; this pointer is always synchronized to a given port's 52 MHz TDM slot |
| CtReadWordPtr[3:0] | Points to the word within the head cell that is being read from for cut-through |

*Fig. 6*

Port Configurations

| PortMode[1:0] | Description |
|---|---|
| 00 (mode 0) | Gigabit Ethernet with input thresholding and no pause control |
| 01 (mode 1) | Gigabit Ethernet with potential pause control |
| 10 (mode 2) | Gigabit Ethernet Virtual Channels or Gigabit Ethernet with input thresholding |
| 11 (mode 3) | Fibre Channel |

Port Modes and Fabric Resource Tracking

| | Port Mode | Fabric Resource Tracking | Input Thresholding | Virtual Channel | Effective Input FIFO | Packets Dropped At: |
|---|---|---|---|---|---|---|
| 0 | Gigabit Ethernet with no pause control | Input Thresholding | Programmed and used for packet dropping at the fabric | Not used | Fabric | Fabric input |
| 1 | Gigabit Ethernet whose link partner will respond to PAUSE control frame | Virtual Channel0 | Not used | Virtual Channel0 programmed (packet dropping will not happen) | Ingress & Fabric | N/A |
| | Gigabit Ethernet whose link partner will not respond to PAUSE control frame | Virtual Channel0 | Not used | Virtual Channel0 programmed (packet dropping will happen at the Gigabit Ethernet MAC) | Ingress & Fabric | Gigabit Ethernet MAC |
| 2 | Gigabit Ethernet with Virtual Channel packets | Virtual Channel0 - Virtual Channel7 | Not used | Virtual Channel0-Virtual Channel7 programmed (packet dropping will not happen) | Fabric | N/A |
| | Gigabit Ethernet with Non-Virtual Channel packets | Input Thresholding | Programmed and used for packet dropping at the fabric | Not used | Fabric | Fabric input |
| 3 | Fibre Channel | Virtual Channel0 | Not used | Virtual Channel0 programmed (packet dropping will not happen) | Fabric | N/A |

Fig. 14

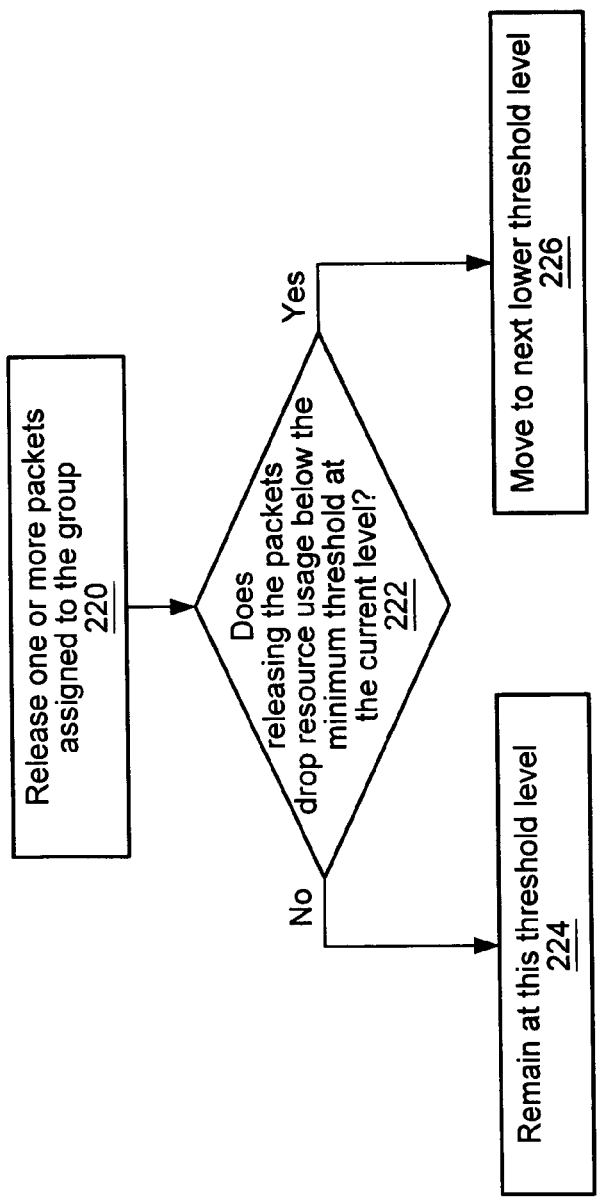

Input Flow Descriptor

| Name | Size (bits) | Description |
|---|---|---|
| Cluster Count | 16 | This field contains the number of cell clusters that are currently allocated to packets sent to this flow. Note that this value is only for packets that were received from ports on this slice. This field is used for input thresholding. |
| Packet Count | 11 | This field contains the number of packet descriptors that are still allocated for frames sent to this flow. Note that this value is only for packets that were received from ports on this slice. This field is used for input thresholding. |
| Threshold Group | 3 | Threshold group to which this flow is assigned. |

Threshold Group Descriptor

| Name | Size (bits) | Description |
|---|---|---|
| Threshold Level | 2 | This field points to the current threshold level for this threshold group<br>00 = low<br>01 = medium<br>1x = high |

*Fig. 19*

Threshold Level Descriptor

| Name | Size (bits) | Description |
|---|---|---|
| Level maximum | 5 (?) | Resource usage maximum for flows at this threshold level |
| Level Upper Threshold | 5 (?) | High threshold for this threshold level |
| Level Lower Threshold | 5 (?) | Low threshold for this threshold level |

*Fig. 20*

PACKET INPUT THRESHOLDING FOR RESOURCE DISTRIBUTION IN A NETWORK SWITCH

CROSS-REFERENCE TO RELATED APPLICATIONS

This application claims the benefit of U.S. Provisional Application No. 60/308,934, filed Jul. 31, 2001.

BACKGROUND OF THE INVENTION

1. Field of the Invention

The present invention generally relates to the field of network switches. More particularly, the present invention relates to a system and method for controlling resource usage through the input thresholding of packets in a network switch.

2. Description of the Related Art

In enterprise computing environments, it is desirable and beneficial to have multiple servers able to directly access multiple storage devices to support high-bandwidth data transfers, system expansion, modularity, configuration flexibility, and optimization of resources. In conventional computing environments, such access is typically provided via file system level Local Area Network (LAN) connections, which operate at a fraction of the speed of direct storage connections. As such, access to storage systems is highly susceptible to bottlenecks.

Storage Area Networks (SANs) have been proposed as one method of solving this storage access bottleneck problem. By applying the networking paradigm to storage devices, SANs enable increased connectivity and bandwidth, sharing of resources, and configuration flexibility. The current SAN paradigm assumes that the entire network is constructed using Fibre Channel switches. Therefore, most solutions involving SANs require implementation of separate networks: one to support the normal LAN and another to support the SAN. The installation of new equipment and technology, such as new equipment at the storage device level (Fibre Channel interfaces), the host/server level (Fibre Channel adapter cards) and the transport level (Fibre Channel hubs, switches and routers), into a mission-critical enterprise computing environment could be described as less than desirable for data center managers, as it involves replication of network infrastructure, new technologies (i.e., Fibre Channel), and new training for personnel. Most companies have already invested significant amounts of money constructing and maintaining their network (e.g., based on Ethernet and/or ATM). Construction of a second high-speed network based on a different technology is a significant impediment to the proliferation of SANs. Therefore, a need exists for a method and apparatus that can alleviate problems with access to storage devices by multiple hosts, while retaining current equipment and network infrastructures, and minimizing the need for additional training for data center personnel.

In general, a majority of storage devices currently use "parallel" SCSI (Small Computer System Interface) or Fibre Channel data transfer protocols whereas most LANs use an Ethernet protocol, such as Gigabit Ethernet. SCSI, Fibre Channel and Ethernet are protocols for data transfer, each of which uses a different individual format for data transfer. For example, SCSI commands were designed to be implemented over a parallel bus architecture and therefore are not packetized. Fibre Channel, like Ethernet, uses a serial interface with data transferred in packets. However, the physical interface and packet formats between Fibre Channel and Ethernet are not compatible. Gigabit Ethernet was designed to be compatible with existing Ethernet infrastructures and is therefore based on an Ethernet packet architecture. Because of these differences there is a need for a new system and method to allow efficient communication between the three protocols.

One such system and method is described in the United States Patent Application titled "METHOD AND APPARATUS FOR TRANSFERRING DATA BETWEEN IP NETWORK DEVICES AND SCSI AND FIBRE CHANNEL DEVICES OVER AN IP NETWORK" by Latif, et al., filed on Feb. 8, 2000 (Ser. No. 09/500,119). This application is hereby incorporated by reference in its entirety. This application describes a network switch that implements a protocol referred to herein as Storage over Internet Protocol (SoIP).

Flow Control Methods

Fibre Channel and Ethernet protocols (e.g. Gigabit Ethernet) use different methods of flow control to ensure that data frames (e.g. packets) are not lost. Ethernet uses special control frames to implement flow control while Fibre Channel uses a credit-based method.

In full duplex Gigabit Ethernet using flow control, when an input port no longer wishes to receive data, a special control frame known as a pause frame is transmitted on the output port. The pause frame includes the amount of time (pause-time parameter) that the transmitter at the other end of the link should delay before continuing to transmit packets (i.e. the amount of time to "pause"). The link can be re-enabled by sending a pause frame with a time of 0.

Gigabit Ethernet ports in a network switch may be coupled to partners that do not use flow control, and thus do not generate or respond to pause frames. Thus, network switches may provide Gigabit Ethernet ports in a network switch that are configurable to not generate or respond to pause frames, and thus to support partners that are not using flow control. In the network switch, there may be limited resources to be shared among incoming packets in the switch. If the limited resources are exhausted, packets may be dropped (i.e. discarded). Prior art network switches typically only track memory (e.g. cell) usage for packets. These prior art switches typically use a static method of resource allocation. In this method, when a packet is received, if there are insufficient cells to store the entire packet, the packet is dropped. Using this static method, under some conditions one or more data streams may monopolize the use of the limited resources in the switch.

SUMMARY

The problems set forth above may at least in part be solved by a system and method that is capable of using a dynamic method of input thresholding received packets in a network switch to control the use of limited resources on the switch. A packet entering a slice of a network switch through a Gigabit Ethernet port may be classified as a packet that is subject to input thresholding, for example, if the packet is not subject to flow control. All packets entering a slice of the network switch that are subject to input thresholding may be assigned to one of one or more threshold groups on the slice and to one of a plurality of flows within the assigned threshold group. Input thresholding may be used in part to prevent a particular flow within a threshold group from using up all of the resources that have been allocated for that threshold group.

A definition of "threshold group" as used herein may include the notion of a structure for managing one or more data streams (e.g. a stream of packets) being received on the network switch using thresholding to control the allocation of resources (e.g. memory portions) to the one or more data streams. In the context of threshold groups, the definition of "flow" as used herein may include the notion of a structure to which incoming packets of the one or more data streams may be assigned to be managed within the threshold group. Thus, a flow within a threshold group may be empty, may include packets from one data stream, or may include packets from multiple data streams. Various parameters used in the implementation of the threshold group and flows of the threshold group may be maintained in hardware and/or software on the network switch.

In general, thresholded packets are subject to being dropped (i.e. discarded) at the input port when the resource allocation limits (associated with the port and the threshold level) are exceeded. Input thresholding may only be applied to IP traffic in the network switch. Storage traffic (e.g. Fibre Channel) in a network switch may not be subject to input thresholding, as it may not be desirable to allow storage traffic to be dropped. For IP traffic, a higher-level protocol (e.g. TCP) may detect packets dropped by the network switch and resend the dropped packets.

In one embodiment, all packets entering a slice of the network switch that are subject to input thresholding may be assigned to one of N threshold groups and one of M flows of the slice, where N and M are positive integers. In one embodiment, threshold group assignment and flow assignment may be performed by a network processor of the network switch. Resources on the slice (e.g. packet descriptors and clusters) may be allocated among the plurality of threshold groups through the use of software-programmable registers on the slice.

In one embodiment, each threshold group may be divided into a plurality of levels of operation. In one embodiment, there are three such group operating levels, and the three group operating levels may be designated as "low", "medium" and "high". As resources are allocated or freed by the threshold group, the threshold group may dynamically move up or down in the operating levels. Within each operating level, one or more different values may be used as level boundaries (thresholds) and resource limits for flows within the threshold group. In one embodiment, programmable registers may be used to store these values.

In one embodiment, specific ports and/or resources in a slice may be allocated for servicing high priority traffic. Input thresholding may be used to drop lower priority traffic so that the resources are available for use by higher priority traffic. In one embodiment, packets may be marked as high priority through the setting of a bit or bits in the packet header. High priority packets may be allowed to "steal" resources from what has been allocated for all the threshold groups as a whole within the slice.

One embodiment may include programmable registers that may be used to control resource allocation and thresholding for the threshold groups. In one embodiment, for each threshold group, there is one set of registers for controlling packet descriptor resource usage and one set for controlling cluster resource usage. In one embodiment, these registers may include a register that specifies the maximum number of clusters or packet descriptors that can be allocated for a threshold group, one or two threshold registers for each operating level that are used to determine when the threshold group has crossed the upper or lower threshold of the operating level, and one register for each operating level that specifies the maximum resource usage allowed for flows at this operating level.

In one embodiment, in addition to the registers listed above, there may be another register on the slice that applies collectively to all the threshold groups. Again there may be two of these registers, one for packet descriptors and one for clusters. This register may specify the maximum number of packet descriptors or clusters that can be allocated to all the threshold groups on the slice. This register may be programmed with a value that is the sum of all the group limit registers for all the different groups on the slice. This register may be used in the handling of "High Priority" packets.

In one embodiment, RAM may be used to track the total clusters and/or packet descriptors being used by each of the threshold groups. Similarly, RAM may be used to track the total clusters and/or packet descriptors being used by each of the flows within the threshold groups.

The following describes a method for input thresholding packets according to one embodiment. The network switch receives a packet. The packet is assigned to a threshold group, and to a flow within the threshold group. The threshold group to which the packet is assigned is at a current operating level, at which the flows in the threshold group are limited to a maximum number of resources (e.g. clusters and/or packet descriptors), also referred to as a resource limit. A determination is made as to whether accepting and storing the packet will cause the flow to which it is assigned to exceed the resource limit for flows at the current operating level. If accepting the packet will cause the flow to exceed the resource limit, then the packet will be dropped, and no threshold group resources are allocated for the packet. If accepting the packet will not cause the flow to exceed the maximum, then a determination is made as to whether accepting the packet will cause the threshold group to exceed a maximum total resource usage for the threshold group. If accepting the packet will cause the threshold group to exceed the maximum, then the packet will be dropped, and no threshold group resources are allocated for the packet. If accepting the packet will not cause the flow to exceed the maximum, then the packet is accepted in the network switch, and the necessary resources (e.g. packet descriptors and clusters) are used for storing the packet. In one embodiment, this resource usage may be tracked, for example, in one or more resource usage registers on the slice.

After accepting the packet into the threshold group, a determination is made as to whether accepting the packet causes the threshold group resource usage to exceed the maximum threshold at the current level. If the maximum threshold level is exceeded, then the threshold group moves to the next higher threshold level. Note that, if enough resources are used, the threshold group may move up more than one threshold level.

A threshold group may also move to a lower threshold level. Releasing previously accepted packets (e.g. after successful transmission or dropping) from the network switch results in resources (e.g. packet descriptors and clusters) being freed for use. Releasing packets results in the packets being removed from the threshold groups to which they were previously assigned. If removing one or more packets from a threshold group drops resource usage of the threshold group below the minimum threshold of the current operating level, then the threshold group moves to the next lower threshold level. Note that, if enough resources are released, the threshold group may drop more than one threshold level.

In one embodiment, a network switch configured to provide input thresholding for Gigabit Ethernet packets received without flow control may comprise a number of input ports, a number of output ports, a memory, and data transport logic coupled between the input ports, the output ports, and the memory. In one embodiment, the network switch may comprise one or more chips or slices, each of which includes support for a subset of the ports of the network switch. The input ports may be configured to receive data forming a packet, wherein the packet may have a destination that corresponds to one or more of the output ports. The network switch may include a shared memory that may be a random access memory (e.g., an SRAM, SDRAM, or RDRAM). In some embodiments, the network switch may be configured to allocate storage within the shared memory using portions of memory referred to herein as cells. As used herein, a cell may be defined as a memory portion including the minimum number of bytes that can be read from or written to the shared memory (e.g., 512 bits or 64 bytes). The cell size is a function of the memory interface with the shared memory. However, in some embodiments, a number of cells (e.g., two cells) may be used in combination. Such a combination of cells may be referred to as a cluster. Clusters may be used to reduce the number of bits required for tracking and managing packets. Each slice of the switch may also include packet admission logic configured to manage input thresholding for packets assigned to threshold groups on the slice. In one embodiment, each slice may include a number of registers configured to store values used in managing input thresholding for the threshold groups.

The switch may also comprise one or more network processors configured to add an Ethernet prefix to received Fibre Channel packets in response to detecting that the Fibre Channel packets are being routed to an Ethernet output port. While different configurations are possible and contemplated, in one embodiment of a network switch, the input and output ports are Fibre Channel or Gigabit Ethernet ports.

BRIEF DESCRIPTION OF THE DRAWINGS

The foregoing, as well as other objects, features, and advantages of this invention may be more completely understood by reference to the following detailed description when read together with the accompanying drawings in which:

FIG. 2 illustrates details of one embodiment of a packet descriptor;

FIG. 5 is a diagram illustrating one embodiment of the structure of the input FIFO from FIG. 1;

FIG. 6 illustrates one embodiment of a set of pointers that may be used in connection with the input FIFO of FIG. 1;

FIG. 14 is a table summarizing various aspects of port modes, fabric resource tracking and the conditions in which packets may be dropped according to one embodiment;

FIG. 17 is a flowchart illustrating a method of moving a threshold group to a lower threshold level according to one embodiment;

FIG. 18 illustrates an input flow descriptor that may be used to track resource usage for flows according to one embodiment;

FIG. 19 illustrates a threshold group descriptor that may be used to track current threshold levels for threshold groups according to one embodiment;

FIG. 20 illustrates a threshold level descriptor that may be used to store currently programmed resource usage maximums and thresholds according to one embodiment.

Figure 1:
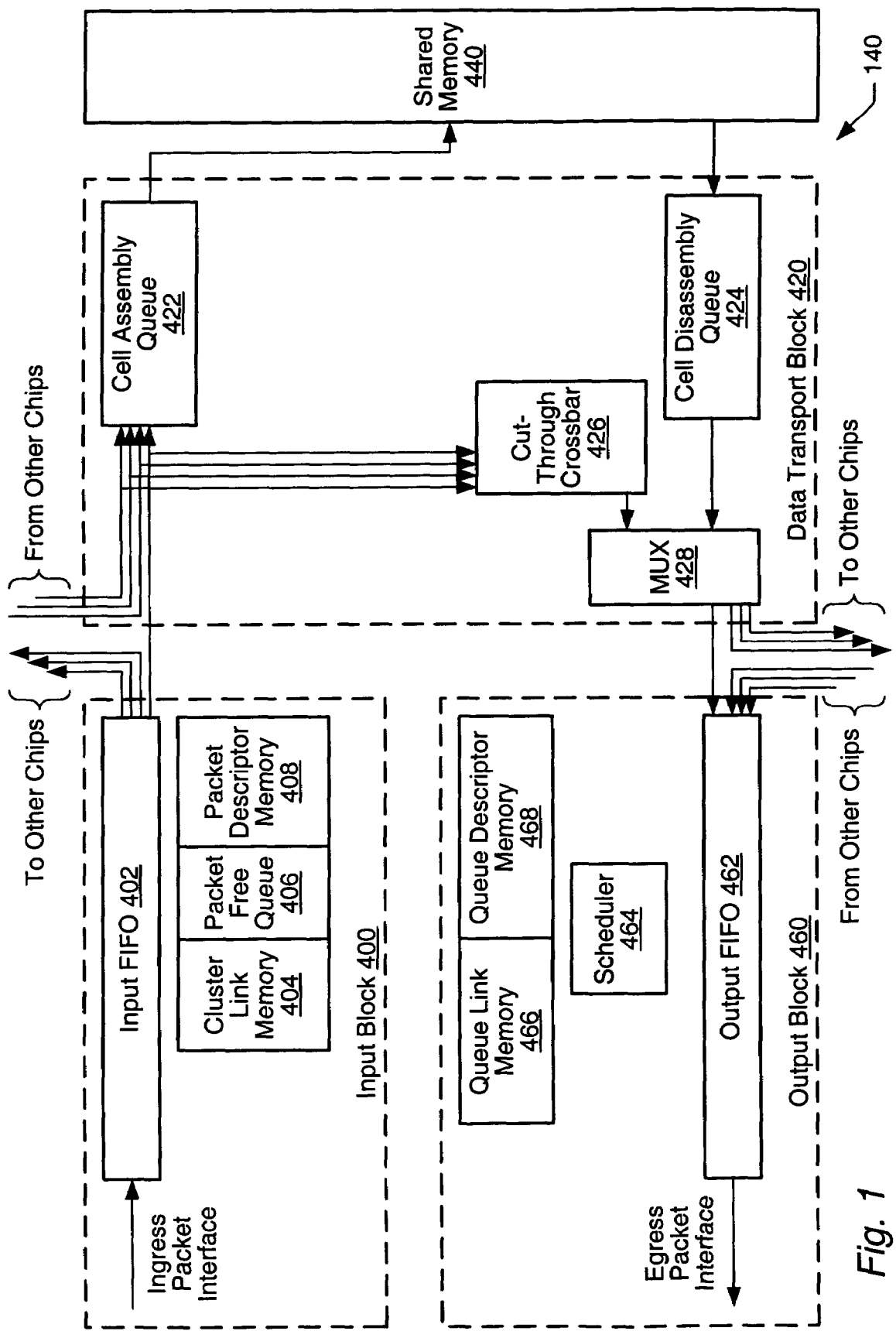
FIG. 1 is a block diagram of a portion of one embodiment of a network switch fabric.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF SEVERAL EMBODIMENTS

Turning now to FIG. 1, a block diagram of a portion of one embodiment of a network switch fabric is shown. In this embodiment, switch fabric portion 140 comprises an input block 400 (which also may be referred to as an ingress block), a data transport block 420, a shared memory 440, and an output block 460 (which also may be referred to as an egress block). The switch fabric may comprise a plurality of switch fabric portions 140 (e.g., 4 or 8 portions, each having one input port and one output port). In one embodiment, input block 400, data transport block 420 and output block 460 are all implemented on a single chip (e.g., an application specific integrated circuit or ASIC). The switch fabric may include one or more input blocks 400, wherein each input block 400 is configured to receive internal format packet data (also referred to as frames), from which it is then written into an input FIFO 402. Input block 400 may be configured to generate packet descriptors for the packet data and allocate storage within shared memory (i.e., RAM) 440. As will be described in greater detail below, the switch fabric may route the packet data in a number of different ways, including a store-and-forward technique, an early forwarding technique, and a cut-through routing technique.

Input block 400 may further comprise a cluster link memory 404, a packet free queue 406, and a packet descriptor memory 408. Cluster link memory 404 may be configured as a linked list memory to store incoming packets. Packet free queue 406 is configured to operate as a "free list" to specify which memory locations are available for storing newly received packets. In some embodiments, input block 400 may be configured to allocate storage within shared memory 440 using cells. In this embodiment, a cell is the minimum number of bytes that can be read from or written to shared memory 440 (e.g., 512 bits or 64 bytes). The cell size is a function of the interface with shared memory 440. However, in some embodiments, a number of cells (e.g., two cells) may be defined as a "cluster". Clusters may be used to reduce the number of bits required for tracking and managing packets. Advantageously, by dividing packets into clusters instead of cells, the overhead for each packet may potentially be reduced. For example, in one embodiment shared memory 440 may allocate memory in 128-byte clusters. The cluster size may be selected based on a number of factors, including the size of shared memory 440, the average and maximum packet size, and the size of packet descriptor memory 408. However, the potential disadvantage is that a small packet that would normally fit within a single cell will nevertheless be assigned an entire cluster (i.e., effectively wasting a cell). While this is a design choice, if the number of small packets is low relative to the number of large packets, the savings may outweigh the disadvantages. In some embodiments, clusters may not be used.

Upon receiving packet data corresponding to a new packet, input block 400 may be configured to allocate clusters in shared memory 440 (using cluster link memory 404) and a packet descriptor to the new packet. Packet descriptors are entries in packet descriptor memory 408 that contain information about the packet. One example of information contained within a packet descriptor may include pointers to which clusters in shared memory 440 store data corresponding to the packet. Other examples may include format information about the packet (e.g., the packet length, if known), and the destination ports for the packet.

In the embodiment of switch fabric 140 shown in FIG. 1, data transport block 420 includes cell assembly queues 422, cell disassembly queues 424, cut-through crossbar switch 426, and multiplexer 428. Cell assembly queues 422 are configured to receive packets from input block 400 and store them in shared memory 440. In one embodiment, cell assembly queues 422 may operate as FIFO memories combined with a memory controller to control the storage of the packets into shared memory 440. Cut-through crossbar 426 is configured to connect selected inputs and outputs together in cooperation with multiplexer 428. Advantageously, this may allow cut-through routing of packets, as explained in greater detail below.

In some embodiments, switch fabric 140 may be implemented using multiple chips that operate in parallel. In these configurations, cell assembly queue 422 and cell disassembly queue 424 may operate as serial-to-parallel and parallel-to-serial converters, respectively. For example, in an implementation having four switch fabric chips, as a particular 4-byte word is received, input FIFO 402 may be configured to distribute the 4-byte word amongst the four chips (i.e., one byte per chip) with one byte going to each chip's data transport block 420. Once 16 bytes have been received in each chip's cell assembly queue 422, the 64-byte cell may be stored to shared memory 440. Similarly, assuming a 128-bit data interface between shared memory 440 and the four switch fabric chips 140, a 64-byte cell may be read from shared memory 440 in four 16-byte pieces (i.e., one piece per chip), and then converted back into a single serial stream of bytes that may be output one byte per clock cycle by output FIFO 462.

Shared memory 440 may have write ports that are coupled to cell assembly queues 422, and read ports coupled to cell disassembly queues 424. In one embodiment, switch fabric 140 may support multiple ports for input and output, and switch fabric 140 may also be configured to perform bit-slice-like storage across different banks of shared memory 440. In one embodiment, each switch fabric 140 may be configured to access only a portion of shared memory 440. For example, each switch fabric may be configured to access only 2 megabytes of shared memory 440, which may have a total size of 8 megabytes for a 16-port switch. In some embodiments, multiple switch fabrics may be used in combination to implement switches supporting larger numbers of ports. For example, in one embodiment each switch fabric chip may support four full duplex ports. Thus, two switch fabric chips may be used in combination to support an eight-port switch. Other configurations are also possible, e.g., a four-chip configuration supporting a sixteen-port switch.

Output bock 460 comprises output FIFO 462, scheduler 464, queue link memory 466, and queue descriptor memory 468. Output FIFO 462 is configured to store data received from shared memory 440 or from cut-through crossbar 426. Output FIFO 462 may be configured to store the data until the data forms an entire packet, at which point scheduler 464 is configured to output the packet. In another embodiment, output FIFO 462 may be configured to store the data until at least a predetermined amount has been received. Once the predetermined threshold amount has been received, then output FIFO 462 may begin forwarding the data despite not yet having received the entire packet. This is possible because the data is being conveyed to output FIFO 462 at a fixed rate. Thus, after a predetermined amount of data has been received, the data may be forwarded without fear of underflow because the remaining data will be received in output FIFO 462 before an underflow can occur. Queue link memory 466 and queue descriptor memory 468 are configured to assist scheduler 464 in reassembling packets in output FIFO 462.

Data that can be cut-through is routed directly through cut-through crossbar logic 426 and multiplexer 428 to the output FIFO 462, and then to the egress packet interface (e.g., a 16-bit output interface). Packets that cannot be cut-through are stored in shared memory 440. These packets are added to one of several output queues. An internal scheduler selects packets from the various queues for transmission to an output port. The packet is read from the SRAM, passed through the output FIFO, and then sent to the egress packet interface. The ingress and egress packet interfaces may include interface logic such as buffers and transceivers, and physical interface devices (e.g., optics modules).

Next, one example of how a packet may be routed in the switch will be described. When a first packet arrives at an input port from the ingress packet interface, it is routed to input FIFO 402 for temporary storage. An entry for the packet is created and stored into packet descriptor memory 408. This new entry is reflected in packet free queue 406, which tracks which of the entries in packet descriptor memory 408 are free. Next, the packet is briefly examined to determine which output port(s) the packet is to be routed to. Note, each packet may be routed to multiple output ports, or to just a single output port. If the packet meets certain criteria for cut-through routing (described in greater detail below), then a cut-through request signal is conveyed to the corresponding output port(s). Each output port that will receive the packet may detect the signal requesting cut-through routing, and each output port makes its own determination as to whether enough resources (e.g., enough storage in output FIFO 462) are available to support cut-through. The criteria for determining whether an output port is available are described in detail below. If the output has the resources, a cut-through grant signal is sent back to the input port to indicate that cut-through is possible. The packet is then routed from input FIFO 402 to the corresponding output port's output FIFO 462 via cut-through crossbar 426.

If one or more of the packet's corresponding output ports are unable to perform cut-through, or if the packet does not meet the requirements for performing cut-through, then the process of writing the packet from input FIFO 402 to shared memory 440 begins. Cell assembly queue 422 effectively performs a serial-to-parallel conversion by dividing the packet into cells and storing the cells into shared memory 440. Information about the clusters allocated to the packet is stored in cluster link memory 404 (i.e., enabling the cells to be read out of shared memory 440 at some future point in time). As noted above, in early forwarding, shared memory 440 operates in a manner somewhat similar to a large FIFO memory. The packet is stored in a linked list of clusters, the order of which is reflected in cluster link memory 404. Independent of the process of writing the packet into shared memory 440, a packet identifier (e.g., a number or tag) is added to one output queue for each corresponding output port that will receive a copy of the packet. Each output port may have a number of output queues. For example, in one embodiment each output port may have 256 output queues. Having a large number of queues allows different priorities to be assigned to queues to implement different types of scheduling such as weighted fair queuing. Adding a packet number to one of these queues is accomplished by updating queue link memory 466 and queue descriptor memory 468. Scheduler 464 is configured to employ some type of weighted fair queuing to select packet numbers from the output queues. As noted above, details of one embodiment of scheduler 464 (also referred to as a scheduling unit) are described in U.S. patent application Ser. No. 09/685,985, titled "System And Method For Scheduling Service For Multiple Queues," by Oberman, et al., filed on Oct. 10, 2000.

Figure 3:
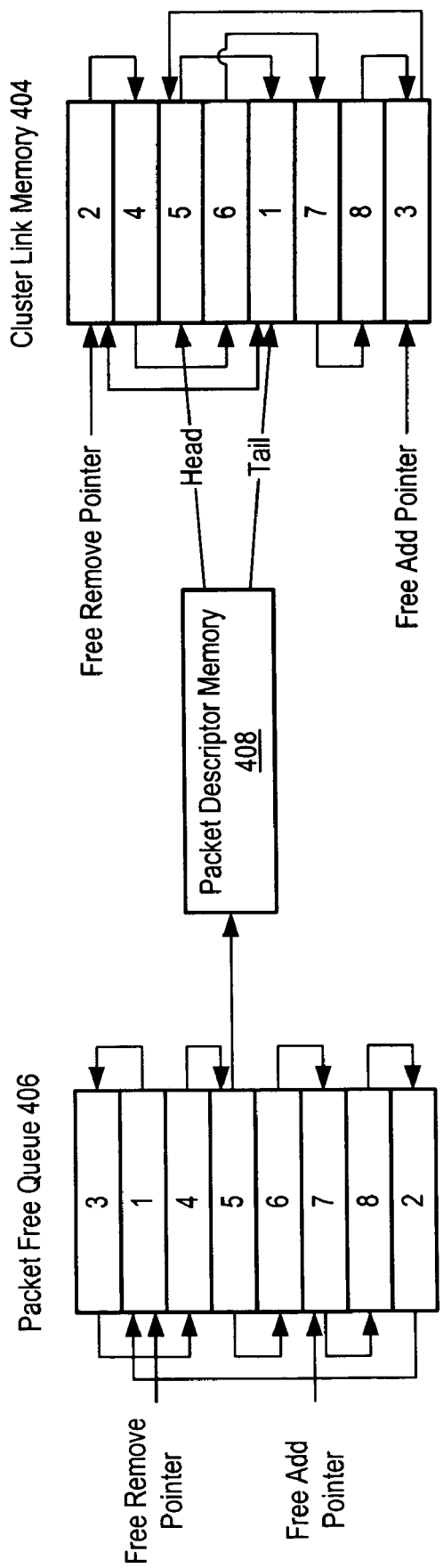
FIG. 3 illustrates details of one embodiment of the cluster link memory, packet free queue, and packet descriptor memory from FIG. 1.
Figure 4:
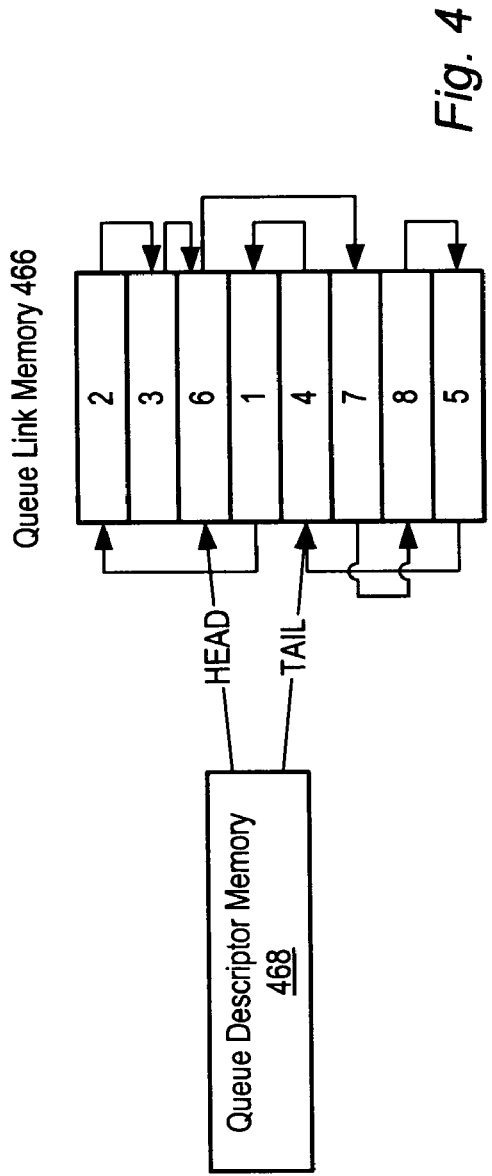
FIG. 4 illustrates details of one embodiment of the queue descriptor memory and queue link memory from FIG. 1.

Once a packet number is selected from one of the output queues, the corresponding packet is read from shared memory 440, reformatted into a serial stream from by cell disassembly queue 424, and routed to the corresponding output FIFO 462. From the output FIFO the packet is eventually output to the network through the egress packet interface. However, unless store and forward routing is used (i.e., a worst case scenario from a latency standpoint), the process of reading the packet from shared memory 440 into output FIFO 462 begins before the entire packet has been stored to shared memory 440. In some cases, the process of transferring the packet from shared memory 440 to output FIFO 462 may begin even before the entire packet has been received in input FIFO 402. How soon the output port can begin reading after the input port has started writing depends on a number of different factors that are described in greater detail below. Block diagrams for the main link memories in the input block 400 and output block 460 are shown in FIGS. 3 and 4. More details of input block 400 and output block 460 are also described below.

Turning now to FIG. 2, details of one embodiment of a packet descriptor 490 are shown. Note, as used herein a "packet descriptor" is different from a "packet identifier" (also called a "packet number"). While a packet descriptor stores information about a packet, a packet identifier is a number that identifies a particular packet that is being routed by the switch. Additional information may optionally be included in the packet identifier depending on the embodiment. As illustrated in the figure, this embodiment of the packet descriptor includes a queue count field 490A, a cluster count field 490B, an input flow number field 490C, a threshold group/virtual channel number field 490D, a cell list head field 490E, a cell list tail field 490F, a tail valid indicator bit 490G, an error detected indicator bit 489H, an indicator bit for packets that are to be dropped when scheduled 490I, a source port field 490J, and a high priority indicator field 490F. However, other configurations for packet descriptors are also possible and contemplated.

FIG. 3 illustrates details of one embodiment of cell link memory 404, packet free queue 406, and packet descriptor memory 408. As shown in the figure, packet free queue 406 comprises a linked list of pointers to free packet descriptors within packet descriptor memory 408. While different configurations are possible and contemplated, each packet descriptor may comprise a start or head pointer and an end or tail pointer to cluster link memory 404. Cluster link memory may comprise pointers to different memory locations within shared memory 440. In some embodiments, two free pointers (i.e., a free add pointer and a free remove pointer) may be used to access available locations within packet free queue 406. This causes packet free queue to act as a queue as opposed to a stack. This configuration may advantageously yield lower probability of soft errors occurring in times of low utilization when compared with a configuration that utilizes packet free queue 406 as a stack.

FIG. 4 illustrates details of one embodiment of queue descriptor memory 468 and queue link memory 466. Queue descriptor memory 468 may be configured to store pointers indicating the start and end of a linked list in queue link memory 466. Each entry in queue link memory 466 is part of a linked list of pointers to packet numbers for representing packets stored in shared memory 440.

Turning now to FIG. 5, a diagram illustrating one embodiment of the structure of input FIFO 402 is shown. Each input port may have its own input FIFO. The input FIFO may be configured to hold four cells 468A–D, wherein each cell contains 16 32-bit words. A separate routing control word (RCW) FIFO 464A–D may be included to hold four data words corresponding to the four RCWs that could be present for the four cells (i.e., assuming each cell contains a unique packet). A separate length FIFO 462A–D may also be included to hold the length of up to four packets that may be present in input FIFO 402. A separate set of 64 flip-flops 470 may be used to hold a 1-bit EOF flag, indicating whether the corresponding input FIFO word is the last word of a packet. A related set of four flip-flops 466A–D, one per cell, may be used to indicate whether an EOF exists anywhere within a cell. Note that the figure merely illustrates one particular embodiment, and that other embodiments are possible and contemplated.

FIG. 6 illustrates one embodiment of a set of pointers that may be used in connection with input FIFO 402 of FIG. 5. Pointers 472A–B point to the head and tail of FIFO 402, respectively. Pointer 474 points to the saved first cell for the currently read packet. Pointer 476 points to the word within the tail cell (as indicated by pointer 472B) that is being written to. Pointer 478 may be used to point to the word within the head cell (as indicated by pointer 472A) that is being read from for store-and-forward routing, while pointer 480 may be used to point to the word within the head cell that is being read from for cut-through routing. As described in greater detail below, cut-through routing forwards a received packet directly to an output port without storing the packet in shared memory 440. In contrast, early forwarding routing places received packets into shared memory 440 until the output port is available (e.g., several clock cycles later).

Figure 7:
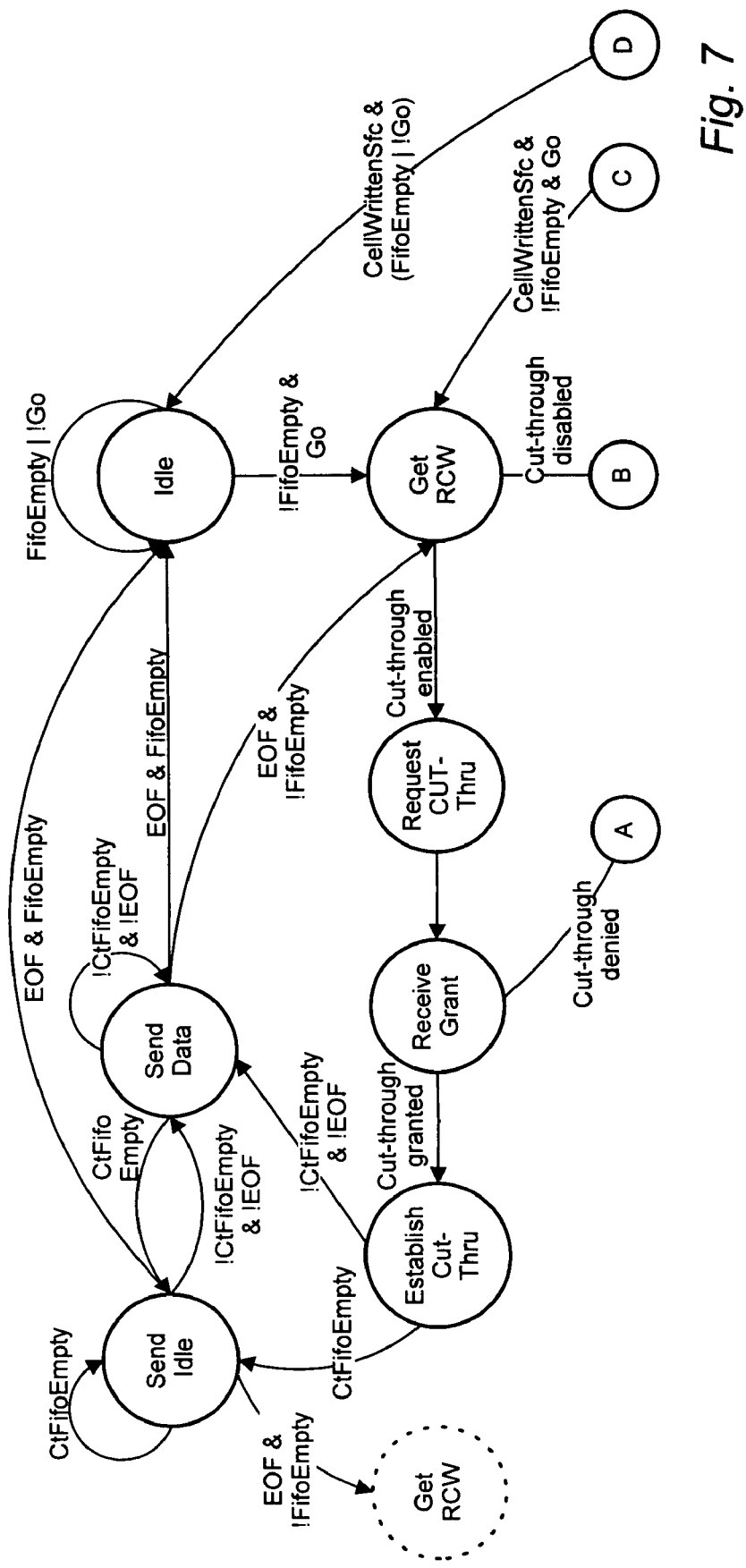
FIG. 7 illustrates one embodiment of a state machine that may be used to operate the input FIFO from FIG. 1.
Figure 7:
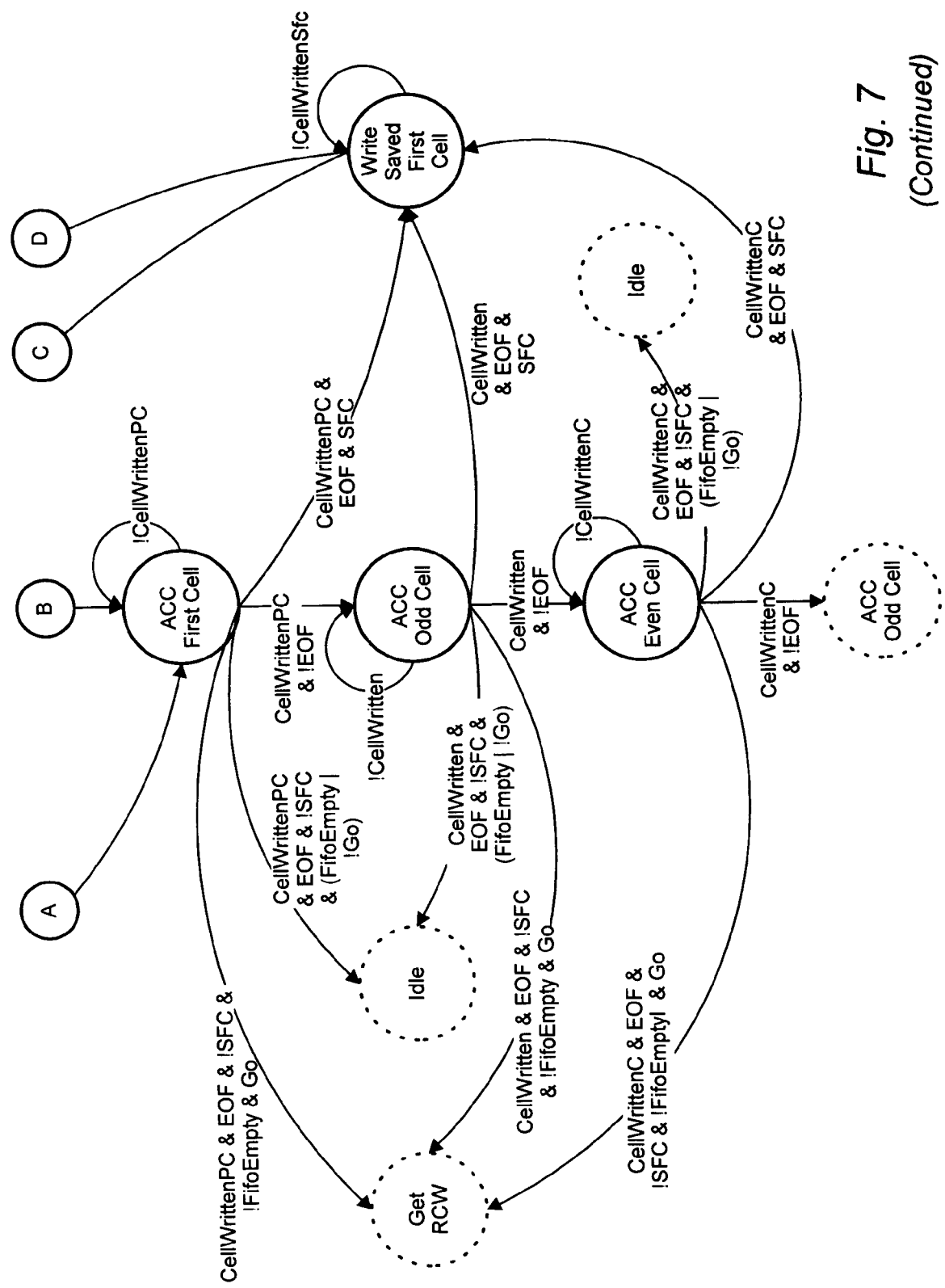

FIG. 7 illustrates one embodiment of a state machine that may be used to operate input FIFO 402 from FIG. 6. In some embodiments, the state machine of FIG. 7 may be implemented in control logic within input block 400. The input block 400 may include an input FIFO controller to manage both reads and writes from input FIFO 402. The controller may control reading of the input FIFO 402, extracting routing information for a packet, establishing cut-through (if possible), and sending the packet to shared memory 440 if cut-through is not possible or granted. Further, in cases where the length of a packet is written into the header, the controller may save the first cell of the packet in input FIFO 402. After reading and storing the rest of the packet, the controller may return to the saved first cell and write it to shared memory 440 with an updated length field. One potential advantage to this method is that it may reduce the processing required at egress. For example, in the case of a packet going from a Fibre Channel port to a Gigabit Ethernet port (i.e., an IP port), normally the packet would be stored in its entirety in the output FIFO so that the length could be determined and the header could be formatted accordingly. However, by saving the first cell in the input FIFO, the length of the packet may be determined once the packet has been completely written to shared memory. The header (in the first cell) may then be updated accordingly, and the first cell may be stored to shared memory. Advantageously, the packet is then ready to be output without undue processing in output block 460.

In one embodiment, the controller (i.e., state machine) may run at either an effective 104 MHz or 52 MHz, based upon whether it is a 1 Gbps or 2 Gbps port (e.g., with an actual clock frequency of 104 MHz). State transitions may occur every-other cycle in the 1 Gbps case, or every cycle in the 2 Gbps case. These are merely examples, however, and other configurations and operating frequencies are also possible and contemplated.

Figure 8:
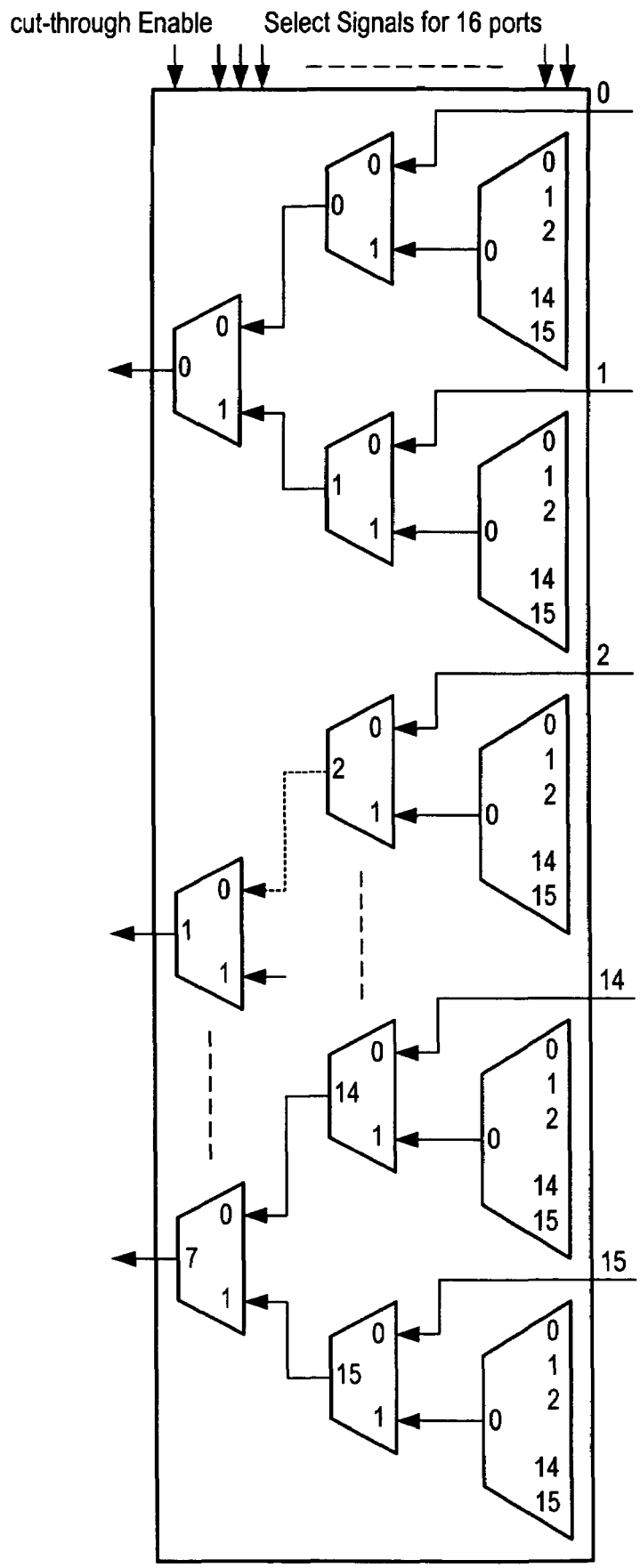
FIG. 8 is a diagram illustrating details of one embodiment of multiplexing logic within the data transport block of FIG. 1.

FIG. 8 is a diagram illustrating details of one embodiment of multiplexing logic 428 within data transport block 420. Multiplexing logic 428 selects the data that should be forwarded to the output port (i.e., via output FIFO 462). If early forwarding/store-and-forward routing is used, then multiplexing logic 428 will select the data coming from shared memory 440's read data port queue. If the data to be forwarded is a cut-through packet, multiplexing logic 428 selects the data from cut-through cross bar 426 and sends it to the output port depending on the select signals generated by the control logic. If cut-through routing is disabled, then the data from the shared memory 440 is forwarded. In one embodiment, multiplexing logic 428 is configured to only select the cut-through data for the ports for which cut-through routing is enabled. For all the other ports, the data from shared memory 440's read queues is forwarded.

The first set of multiplexers 620 select the input port data from which it needs to be cut-through depending on the port select signal generated by the cut-through master. Once the correct port data is selected, the next set of multiplexers 622 selects between the cut-through data or the data from the SRAM read queues. The control logic will clear the cut-through select bit once the cut-through forwarding is complete so that the data from shared memory 440 read queues is forwarded as soon as the cut-through is disabled.

To save pin count, in some embodiments two output ports may share one data bus. In this configuration the data from two adjacent ports is multiplexed and sent to the output block. For example, in 1 Gb mode, port N uses the first 104 MHz clock and port N+1 uses the second 104 MHz clock for the data. This means that the effective data-rate per port in 1 Gb mode is 52 MHz. In 2 Gb mode, each cycle contains data for port N, and thus the effective data-rate is 104 MHz. However, other configurations and operating speed are also possible and contemplated.

Figure 9:
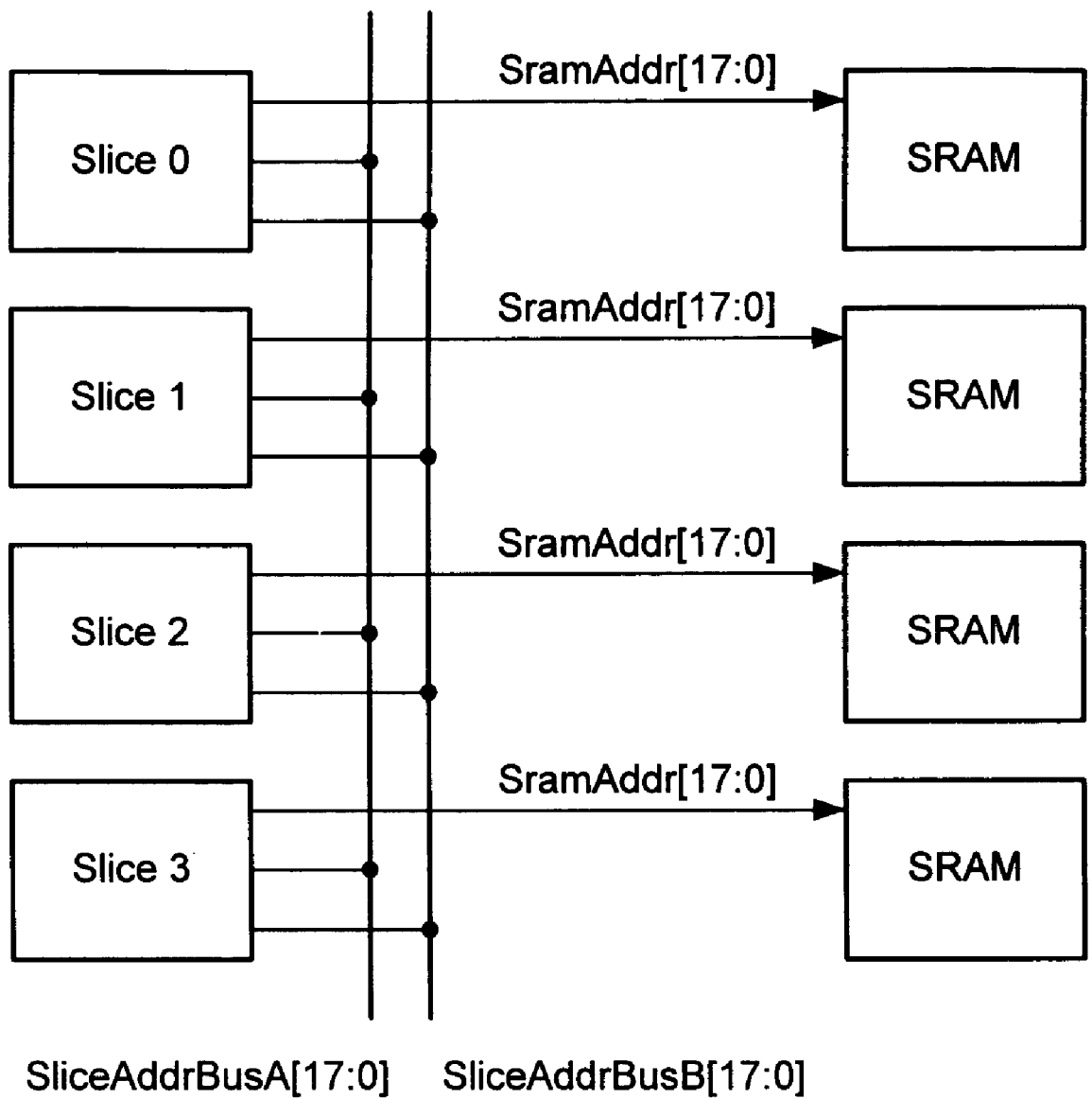
FIG. 9 illustrates details of one type of address bus configuration that may be used with the shared memory (RAM) of FIG. 1.

FIG. 9 illustrates details of one type of address bus configuration that may be used with shared memory 440. As shown in the figure, shared memory 440 may be divided into a plurality of blocks 630A–D, wherein each block corresponds to a slice 632A–D (i.e., one portion of input block 400, data transport block, and output block 460). For example, shared memory 440 may be 8 megabytes of SRAM (static random access memory), with each slice 632A–D accessing its own block 630A–D that is 2 MB of external SRAM. Note that shared memory 440 may be implemented using any type of random access memory (RAM) with suitable speed characteristics.

In this embodiment, the interface between the slices 632A–D and the external SRAM blocks 630A–D is a logical 128-bit data bus operating at 104 MHz, but other bus configurations are possible. However, it is possible for any slice to read from another slice's SRAM block; in a four-slice implementation, the full data interface across four slices is 512-bits, with data distributed across all four external SRAM blocks 630A–D. As a result, any given slice needs to address all four SRAM blocks whenever it needs to do an SRAM read or write access. This leads to a number of different possibilities for how the address buses can be arranged between the slices and shared memory 440. Some of these options include using some form of shared global address bus that is time division multiplexed (TDM) between the 16 ports.

In one embodiment, all slices share a single global TDM address bus connected to all SRAM blocks. However, it may be difficult to drive this bus at higher frequencies (e.g., 104 MHz) because the bus would have to span the entire motherboard and have multiple drops on it. In another embodiment, two 52 MHz TDM global address buses are used. Ports 0 and 2 on the slice drive address bus A on positive edges of the 52 MHz clock, and ports 1 and 3 drive address bus B on negative edges of the 52 MHz clock. An external multiplexer may then be used in front of each SRAM block (e.g., selected by a 52 MHz clock and with the two global buses as inputs). The output of the multiplexer is fed to a flip-flop clocked by the 104 MHz clock. With this timing, there are two 104 MHz cycles for the inter-slice address buses to travel and meet the setup timing to the 104 MHz flip-flop. There is one 104 MHz cycle for the output address bus from the multiplexer to meet the setup timing to the SRAM pins. Other configurations and timings are possible and contemplated.

Figure 10:
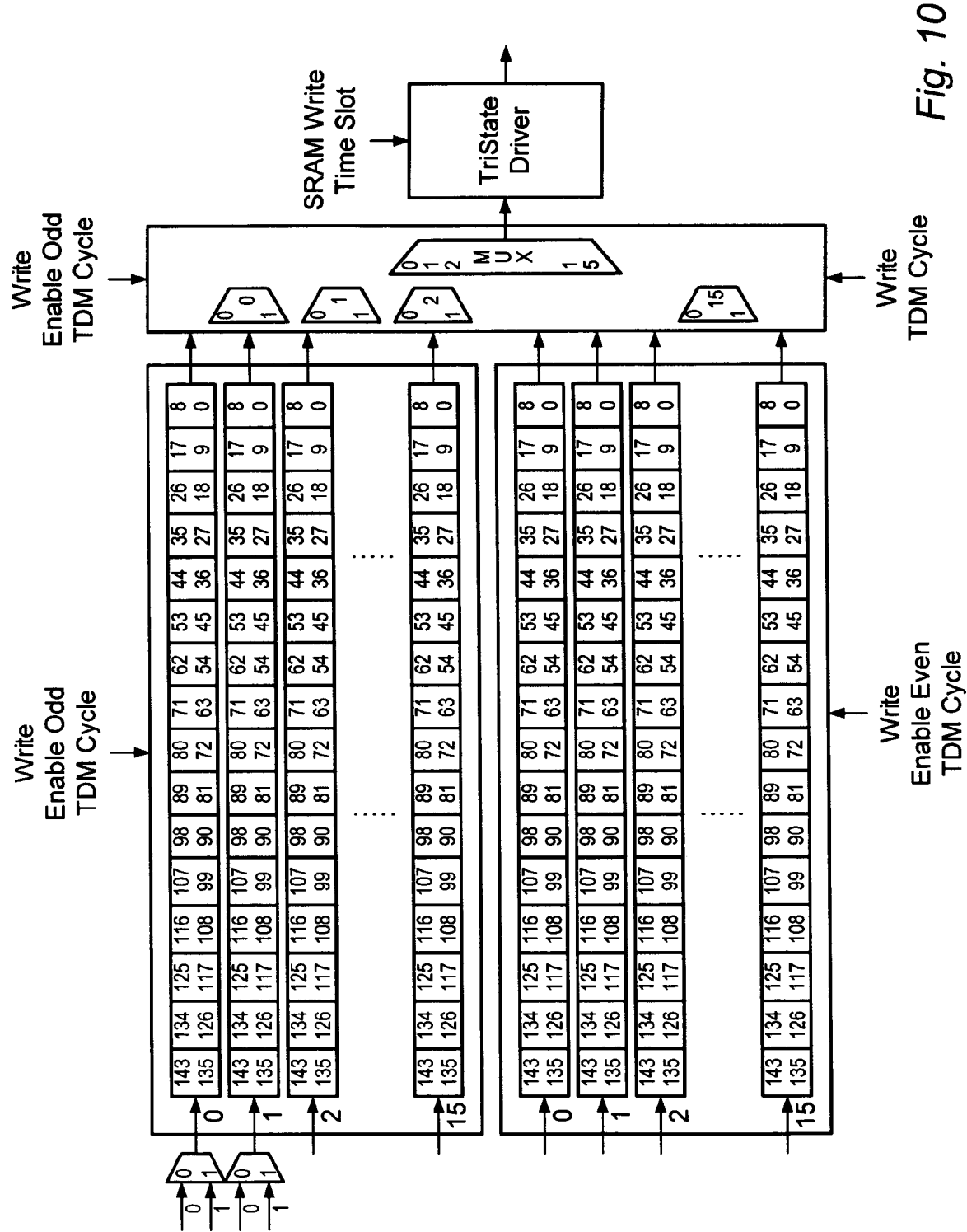
FIG. 10 illustrates one embodiment of a cell assembly queue within the data transport block of FIG. 1.

For example, in yet another embodiment, the multiplexer and flip-flop are integrated into data transport block 420 and switch fabric 140. This configuration may use two extra sets of 18 bit address pins on the switch fabric 140 chip to support bringing the two effective 52 MHz shared buses into and out of the chip. A port drives the shared address bus in the TDM slot of the output port that requested the data. In all other slots, it receives the addresses that are sent on the buses and repeats them onto the local SRAM bus. This embodiment is illustrated in FIG. 10. Note that in this embodiment the buses may be clocked at a higher frequency (e.g., 104 MHz), while the data rate (e.g., 52 MHz) is achieved by driving the addresses on the buses for two consecutive cycles.

FIG. 10 illustrates one embodiment of cell assembly queue 422 within data transport block 420. As shown in the figure, assembly queue 422 receives 8 data transport buses coming into the slice and writes the lower 9-bits of the data into the respective SRAM write queue 640. One motivation behind performing cell assembly is to increase bandwidth for embodiments that have wide ports to shared memory 440. However, if cells are used it may be desirable to configure the system to have greater memory bandwidth than the total port bandwidth in order to achieve desirable performance levels. For example, when a packet is received, additional information (e.g., overhead including routing control information and IP header information for Fibre Channel packets) is added to it. A worst-case scenario may occur when the packet is less than 64 bytes long, but the overhead added to the packet causes it to be greater than 64 bytes long (e.g., 66 bytes long). In this situation, a second cell is used for the final 2 bytes of the packet. Thus, to ensure that the switch is not unduly limiting the performance of the network, a 2× speed up in total memory bandwidth compared with total line bandwidth may be desirable.

In one embodiment, it takes a complete TDM cycle to accumulate 144-bits for a single 1 Gbs port (128 bits of data and 16 control bits). After accumulating 144-bits of data, the data is written to shared memory 440 in the port's assigned write timeslot in the next TDM cycle. The data will be written into shared memory 440 in a timeslot within the same TDM cycle. Thus, while writing the accumulated data to shared memory 440 for a particular port, there may be additional input data coming from the port that continues to be accumulated. This is achieved by double buffering the write queues 640. Thus, data from the input ports is written to one side of the queue and the data to be written to shared memory 640 is read from the other side of the queue. Each port's 144-bits of accumulated write data is written to the shared memory in the port's assigned write timeslots. In this embodiment, every port is capable of writing a complete cell in a single TDM cycle.

In 2 Gb mode, 144-bits for a port are accumulated in one-half of a TDM cycle, i.e., in sixteen 104 MHz cycles. Each 2 Gb port has two timeslots, as well as a pair of cell assembly/disassembly queues. Thus, every 16 cycles one of multiplexers 642 in front of the cell assembly queues for ports N and N+1 switches the data from flowing into port N's cell assembly queue to flowing into port N+1's cell assembly queue. In this embodiment, when writing into port N's queue, port N+1's queue is neither write-enabled nor shifted. Similarly, when writing into port N+1's queue, port N's queue is neither write-enabled nor shifted. Each queue remains double-buffered, the same as in the 1 Gb mode. Both queues are written to SRAM, in their assigned timeslots.

Double buffering is achieved by having two separate sets of queues 644A and 644B. At any given time, one set is configured for accumulating the data as it comes from the input block, and the other set is configured to write the accumulated data to shared memory 440. This behavior of the queues 644A–B is changed once every complete TDM cycle. In one embodiment, the queues are implemented as a shift register with 9-bits of data shifting right. In 1 Gb mode, the shifting may occur once every two 104 MHz cycles (once every 52 MHz cycle). In 2 Gb mode, the shifting may occur once every 104 MHz cycles. So after 16 writes, the data in the queue 422 will be as shown in FIG. 10. The queues are followed by two stages of multiplexers 642. The first stage of multiplexers are 2-1 multiplexers which are used to select between the two queues based on which one has accumulated the data and is ready to supply it to shared memory 440. The second stage of multiplexers is used to select between the different ports depending on the port's assigned write timeslot. The final selected 144-bits of data are written to shared memory 440. Tri-state driver 648 is used to tri-state the bus between queue 422 and shared memory 440 when the port is in the read TDM slot.

Figure 11:
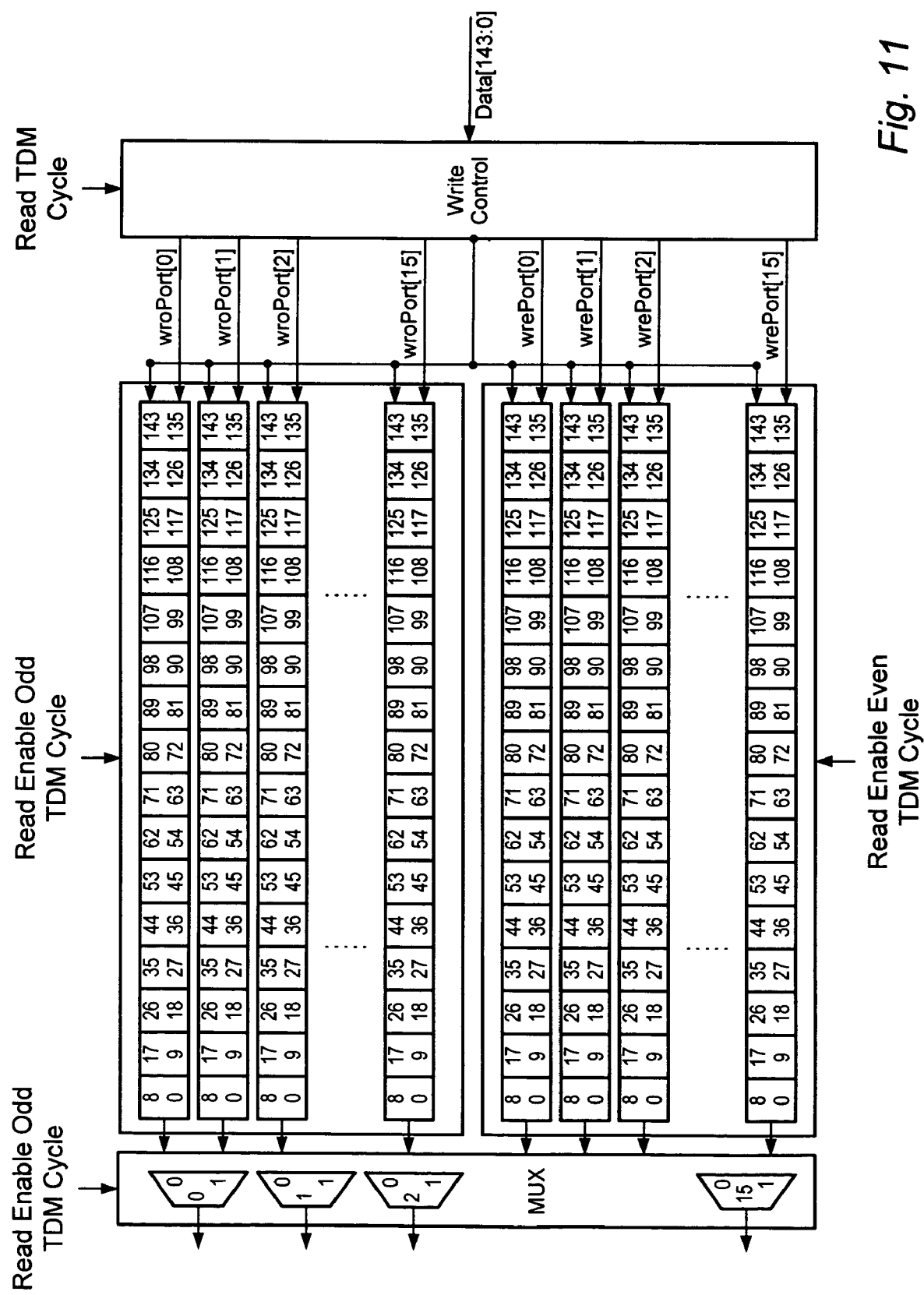
FIG. 11 is a diagram illustrating one embodiment of a cell disassembly queue.

Turning now to FIG. 11, one embodiment of cell disassembly queue 424 is shown. In this embodiment, each port reads 144-bits of data from shared memory 440 in the port's assigned TDM read timeslot. In cut-through forwarding, data transport block 420 is provided with which output ports the packet is being forwarded to, but in the store-and-forward routing mode, data transport block 420 does not have this visibility. Instead, the control logic to read the packet is in input block 400. Input block 400 reads the packet in the output port TDM read timeslot, so the packet is forwarded to the correct output port.

Shared memory 440 write data is written into double-buffered cell disassembly queues 424. Similar to cell assembly queues 422, the data read from shared memory 440 is written to one side of the double-buffered queues while the data sent to the output ports is sent from the other side of the buffer. In one embodiment operating in 1 Gb mode, it may take the entire TDM cycle to read the 16 entries out of the back-buffered cell disassembly queue. In this embodiment, the data is clocked out one word every two 104 MHz cycles from a given queue. Data path multiplexers 665 then switch between the words of adjacent ports to be sent over the inter-slice data path at 104 MHz. In 2 Gb mode, the 16 entries may be read out in one-half of a TDM cycle from the double-buffered cell disassembly queue 424. In this case, data is clocked out one word every 104 MHz cycle. Data path multiplexers 665 then switch between ports N and N+1 every 16 cycles, rather than every cycle, such that contiguous data flows at a data rate of 104 MHz. Note, that the timing given herein is merely for explanatory purposes and is not meant to be limiting. Other operating frequencies are possible and contemplated.

In one embodiment, the data from shared memory 440 is read 144-bits at a time in every read TDM cycle. Based on the read TDM timeslot, the write to the respective port is asserted by the write control logic within queue 424. The write control logic also asserts the corresponding enable signal. In the queues 424, the data order in which the data is sent to the output block is the same order in which the data is received from input block 400. Every cycle, the data sent to output block 460 is from the lower 9-bits of each queue. That means in every other 104 MHz cycle (1 Gb mode), or every 104 MHz cycle (2 Gb mode), the data is shifted to the left so that the next set of data to be sent to output block 460 is in the lower 9-bits of the bus. The output multiplexers 424 select the data from the side of the shared memory that is not writing the data and send the 9-bits to output block 460.

Figures 12, 13:
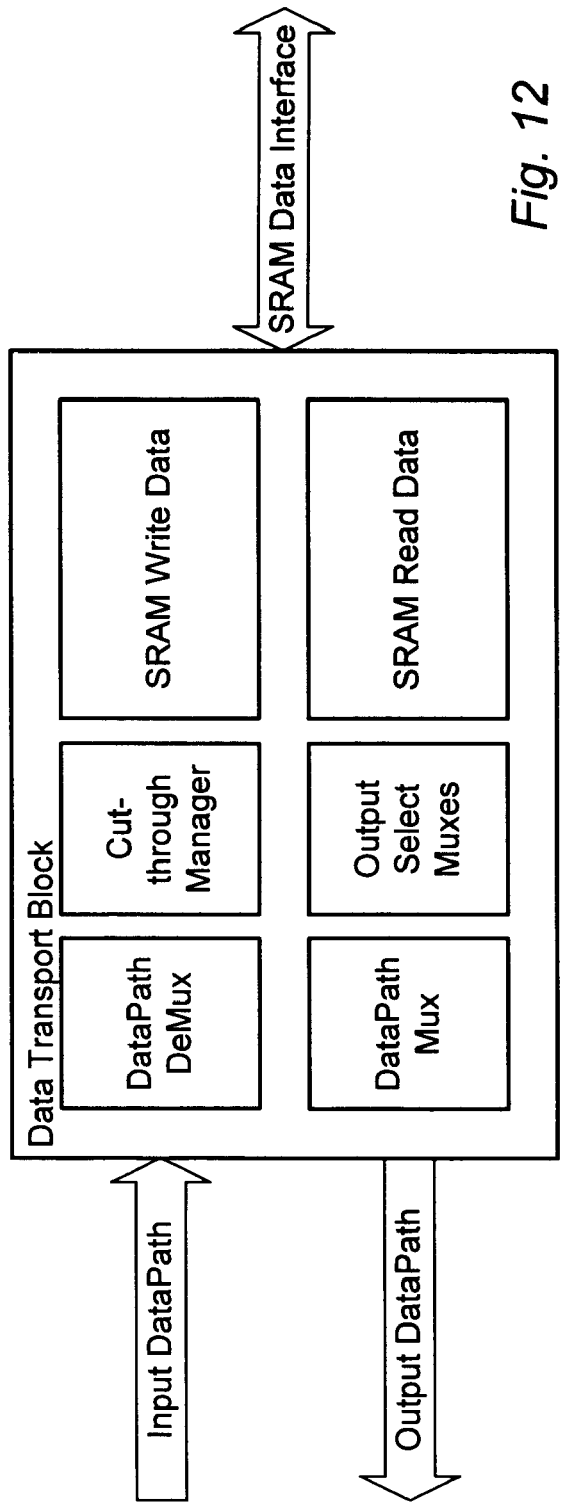
FIG. 12 is a data flow diagram for one embodiment of the data transport block from FIG. 1.
FIG. 13 illustrates a field that defines the current operating mode of a port according to one embodiment.

FIG. 12 is a data flow diagram for one embodiment of data transport block 420. Input data path 670 connects data buses (e.g., 10-bits wide) from the input blocks 400 of all slices. The tenth bit communicates a "cut-through" command, while the other nine bits carry data from input blocks 400. The cut-through command may be used to establish a cut-through connection between the input and output blocks. In the case of cut-through, the input data can be sent directly to the output data buses. For early forwarding/store-and-forward routing, the data is sent to the cell-assembly queues 422 and shared memory 440.

In one embodiment, output data path 672 connects to the 9-bit data buses of the output blocks of all slices. These data buses are used to carry data to the output blocks. The output data can be sent directly from the input data buses, in the case of cut-through, or for store-and-forward, be sent from the cell-disassembly queues 424.

In another embodiment, the shared memory data interface 674 may provide a means for storing and retrieving data between the switch fabric 140 and shared memory 440. In this embodiment, the interface is 144-bit wide and includes 128-bits for data and 16 control bits. This results in each 32-bit data word having four control bits. Each data word may have one end of file (EOF) bit and an idle bit. The other two bits may be unused.

In one embodiment, the 144-bit bus is a TDM bus that operates at 104 MHz. In each of the first 16 cycles, 144-bits may be read from shared memory 440 and transferred into one of the cell disassembly queues 424. The 17th cycle is a turnaround cycle when no data is sent or received. Then in each of the second 16 cycles, the 144-bit contents of one of the cell assembly queues 422 are transferred to the SRAM across the bus. The 34th cycle is a turnaround cycle when no data is sent or received. This TDM cycle then repeats.

All of the slices may be synchronized with each other so that they drive the shared memory bus and the inter-slice messaging bus in their respective timeslots. Two signals, SYNC_IN and SYNC_OUT are used to achieve this synchronization. SYNC_IN of data transport block 420 is connected to the SYNC_OUT of input block 400. SYNC_OUT of data transport block 420 is connected to the SYNC_IN of output block 460. As shown in the figure, cut-through manager 676 controls the cut-through select signals sent to the output select multiplexers. Output select multiplexers 678 are the final set of multiplexers to select the correct data to be forwarded to output block 460.

In one embodiment, synchronizing the fabric slices allows all of the slices to be aware of or "know" the current timeslot. In one embodiment, the synchronization of the fabric slices may be performed in the following manner. Each fabric slice may have SYNC_IN and SYNC_OUT pins. Each fabric slice will assert SYNC_OUT during time slice 0. Each fabric slice will synchronize its time slice counter to the SYNC_IN signal, which is asserted during time slice 0. Fabric Slice 0 will have its SYNC_IN signal connected to GND (deasserted). SYNC_OUT may be wired from one slice to SYNC_IN of the neighboring fabric slice. The effect is that all fabric slices generate SYNC_IN and SYNC_OUT simultaneously. For example, if the shared memory has 34 timeslots, the timeslot counter may be a mod-34 counter that counts from 0 to 33. When SYNC_IN is asserted, the counter is loaded with 1 on the next clock cycle. When the counter is 33, SYNC_OUT is asserted on the next clock cycle. In one embodiment, an interrupt may be generated to the CPU if a slice loses synchronization.

Port Modes, Resource Tracking and Packet Dropping

This section describes flow control, resource tracking and the conditions under which packets may be dropped (i.e. not forwarded through an output port) in embodiments of a network switch. A network switch may be comprised of one or more chips or slices, each supporting one or more ports. In one embodiment, a network switch may comprise four slices, each supporting four ports, for a total of 16 ports. Other embodiments with other numbers of slices and ports per slice are possible and contemplated. For example, a 2-slice embodiment with 4 ports per slice is contemplated.

In one embodiment, each port of the network switch may operate in one of a plurality of modes. FIG. 13 illustrates a 2-bit field per port that may be used to define the current operating mode of the port according to one embodiment. In one embodiment, the operating mode of each port in a slice may be stored in one or more programmable registers to allow reconfiguration of the operating modes of the ports. In one embodiment, a slice may support two or more ports concurrently configured to operate in different modes.

In one embodiment there may be four modes (modes 0 through 3). FIG. 14 is a table summarizing various aspects of the four port modes, resource tracking and the conditions in which packets may be dropped. In this embodiment, in mode 0 a port may be configured as a Gigabit Ethernet port that does not generate pause frames, and where data flow is regulated via input thresholding (see the section on input thresholding below). In mode 1, a port may be configured as a Gigabit Ethernet port that can negotiate generation and reception of pause frames. The network switch (e.g. fabric) monitors internal watermarks and sends resource usage information to the ingress block (also referred to as the input block). The ingress block monitors its own watermarks and, based on its resource usage and the information it received from the fabric, sends pause control requests to the Gigabit Ethernet MAC (GEMAC) associated with the ingress block.

Embodiments of the network switch may also support a novel virtual channel mode of Gigabit Ethernet. One embodiment of Gigabit Ethernet Virtual Channel may use a credit-based flow control method. One embodiment of a network switch may support K virtual channels per port, where K is a positive integer. In one embodiment, K=8. In mode 2, a port may be configured as a Gigabit Ethernet port supporting virtual channels. In this mode, data may be regulated via credits. Additionally, in this mode packets that are not associated with virtual channels may be regulated via input thresholding. In mode 3 a port may be configured as a Fibre Channel port, and data flow is regulated via credits.

For port mode 0, the Gigabit Ethernet MAC (GEMAC) does not generate pause frames, and also does not respond to pause frames. As such, no flow control is executed in this mode. Instead, input thresholding may be used. In one embodiment of input thresholding, packets entering a slice are assigned to a threshold group and flow within the threshold group. After a packet is assigned to a particular threshold group and flow within the threshold group, resource usage for the threshold group and/or flow may be checked to see if accepting the packet and storing the packet into memory of the network switch will cause the threshold group and/or flow to exceed resource usage limits or thresholds (e.g. a limit on the amount of memory that a particular threshold group and/or flow may use). If at least one of the resources limits or thresholds would be exceeded by accepting and storing the packet, the packet may be dropped (e.g. discarded) from the network switch.

For port mode 1, the GEMAC may generate pause frames and may respond to pause frames (depending on what was negotiated with the GEMAC's link partner during an auto-negotiation phase). So in this case, flow control may or may not be executed. If pause frames are generated and accepted by the link partner, and if the network switch and the link partner are programmed correctly, packets will never be dropped; otherwise packets may be dropped once resources in the input FIFO are exhausted. In one embodiment, for port mode 1, the effective input FIFO comprises the ingress block's configurable Input FIFO and a programmable amount of space in the shared memory.

Gigabit Ethernet Virtual Channel (port mode 2) flow control is based on credits. The fabric, along with the ingress block, egress block and the MACs, keep track of what resources are currently in use. The GEMAC provides the appropriate information (e.g. in the form of virtual channel Ready signals or packets) to its link partner. If things are programmed and working correctly, packets will not be dropped. Otherwise, once resources are exhausted, packets may be dropped.

In one embodiment, information in terms of resource usage is provided by the fabric (ingress path) and to the fabric (egress path) in a uniform manner, and is somewhat independent of the actual mode of a particular port. The information may be used or ignored in a manner that is appropriate for the mode in which the port is configured.

In one embodiment, a management CPU of the network switch may allocate resources for each of the ports on the slice (e.g. four ports) by programming one or more resource configuration registers. For port mode 0, resource allocation may be tracked through the input thresholding mechanism for threshold groups and flows as described below in the section on input thresholding In one embodiment, port mode 0 packets may be classified with the field GrpVcNim[4:0] =1xxx. For port modes 1 and 3, resource allocation information may be tracked and passed to the various blocks within the slice using virtual channel 0 (VC0) registers and signals. In one embodiment, port mode 1 and 3 packets may be classified with the field GrpVcNim[4:0]=00000). For port mode 2, information may be tracked and passed to the various blocks within the slice using each virtual channel's registers and signals. In one embodiment, K=8. In one embodiment, port mode 3 packets may be classified with the field GrpVcNim[4:0]=00xxx.

In one embodiment, resource usage (both packets and clusters) for each of the virtual channels on each of the ports on the slice may be tracked independently of the port mode. If things are programmed correctly, then this information may only be meaningful for port mode 2 (VC0–VC7) and may be partially meaningful for port mode 1 and 3 (VC0 only). As packets get allocated on a virtual channel, the counts in the appropriate resource usage memories may be incremented. As packets are read out of the shared memory, the usage count may be decremented. In one embodiment, this information may be available at every clock cycle for every virtual channel. There also may be some special signals and registers that are used for mode 1 ports.

In one embodiment, at the slice's input block, software programmable registers may be used to define resource allocation limits for every virtual channel on every port for both clusters and packet descriptors. Again, for port modes 1 and 3, only the VC0 numbers may be meaningful and may be the only ones programmed. For port mode 2, up to K virtual channel numbers may be meaningful depending on how many virtual channels have been negotiated, where K is a positive integer representing the maximum number of virtual channels on a port. In one embodiment, K=8. As packets come into the switch and request allocation of resources, the "in use" numbers from the resource tracking memories may be compared against the allocated limit. The input admission logic may successfully allocate the packet only if the "in use" count is less than the allocated limit. Otherwise, the packet may be dropped.

In one embodiment, for mode 1 ports, if pause control is enabled and working (if the link partner accepted pause control during auto-negotiation) then packet dropping should never happen. If pause control is not enabled or not working properly, then packets may not get dropped in the fabric; however, because of backpressure mechanisms implemented in the ingress path, packets may be dropped in the GEMAC. In one embodiment, for ports using credit-based flows (e.g. mode 2 ports (only virtual channel packets) and mode 3 ports), packet dropping should never occur if all the appropriate control registers are programmed correctly.

Figure 15:
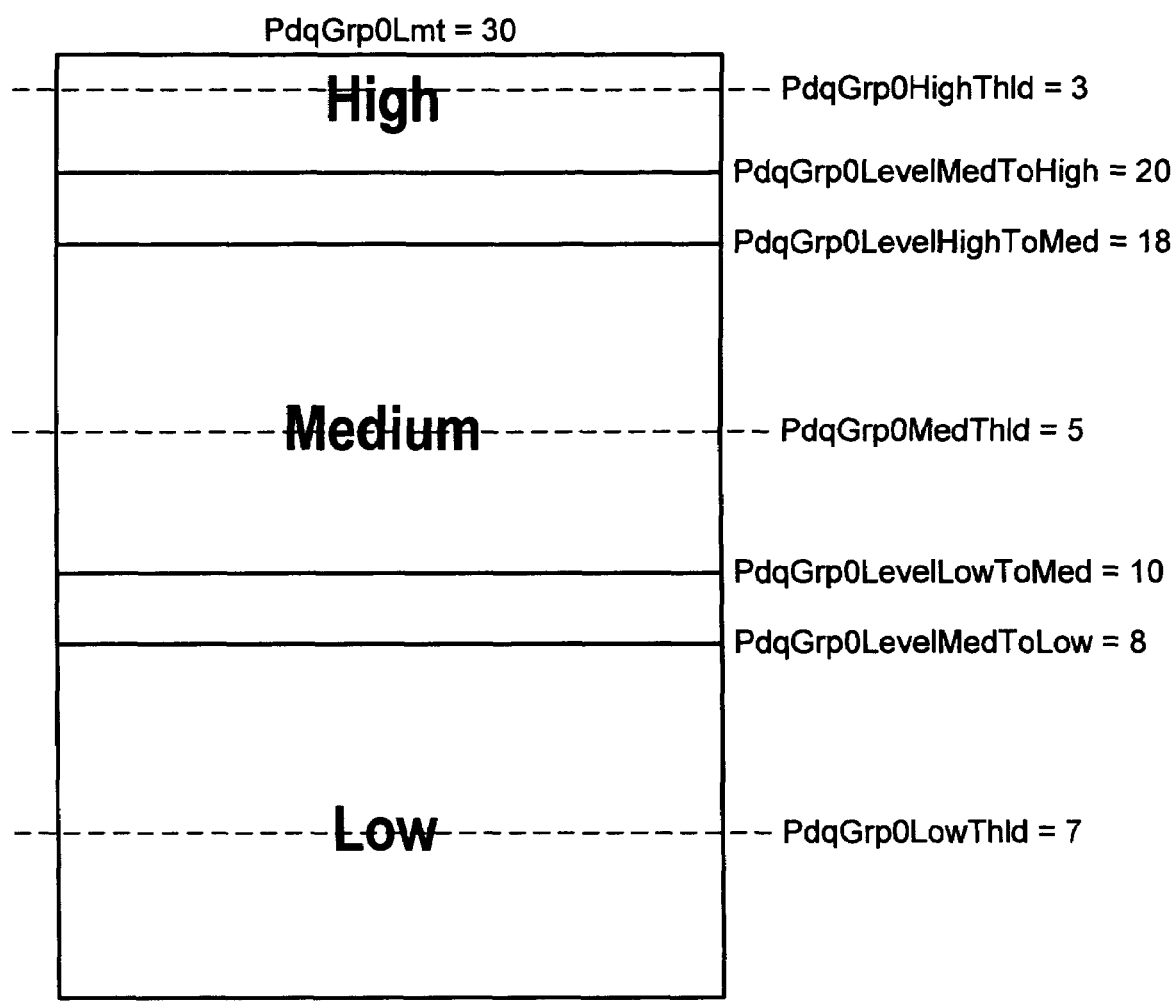
FIG. 15 illustrates multiple levels of thresholding for controlling resource allocation according to one embodiment.

FIGS. 14 and 15 are tables summarizing how resources are tracked in the various port modes. Note that, for ports using flow control (e.g. credit-based or control frame-based flow control), packet dropping should not happen at the fabric if things have been programmed correctly inside the network switch/slice and the link partner(s) are following pause and/or credit-based protocols correctly. If these conditions are not met, then, if resources are not available, flow-controlled packets may be dropped by the network switch. For ports using input thresholding (e.g. port mode 0 and non-virtual channel packets for port mode 2), packet dropping may occur at the fabric if one or more resource limits are reached. In one embodiment, resource tracking for these modes may use registers associated with input thresholding as described below.

As described above, a packet entering a slice of a network switch through a Gigabit Ethernet port may be classified as a packet that is subject to either input thresholding or flow control. In one embodiment, this classification may be achieved through a multi-bit field (e.g. 5 bits), which is used as the virtual channel/threshold group number (e.g. GrpVcNum[4:0]). In this embodiment, one bit (e.g. GrpVcNum[4]) may be used to indicate whether the packet belongs to a (virtual) flow-controlled channel (e.g. GrpVcNum[4]=0), or whether it is subject to input thresholding through assignment to a threshold group (e.g. GrpVcNum[4]=1). A packet is not allowed to belong to both classes. In one embodiment, if the packet is assigned to a virtual channel, the virtual channel number may be designated in the multi-bit field. For example, in one embodiment that supports 8 virtual channels, the lower 4 bits of the multi-bit field may be used to represent the virtual channel number, and the valid values for the lower 4 bits (e.g. GrpVcNum[3:0]) are 0xxx, where xxx may have a value from 0–7 inclusive. In one embodiment, if the packet is subject to input thresholding, the packet may be assigned to a threshold group by a network processor of the network switch. For packets assigned to a threshold group, the multi-bit field may include a threshold group number. In one embodiment where there are 16 threshold groups, the lower 4 bits of the multi-bit field may be used to represent the threshold group number, and the valid values for the lower 4 bits (e.g. GrpVcNum[3:0]) are 0–15 inclusive.

Input Thresholding

A packet entering a slice of a network switch through a Gigabit Ethernet port may be classified as a packet that is subject to input thresholding, for example, if the packet is not subject to flow control. In general, thresholded packets are subject to being dropped at the input port when one or more resource allocation limits are exceeded. Input thresholding may only be applied to IP traffic in the network switch. Storage traffic (e.g. Fibre Channel traffic) in a network switch may not be subject to input thresholding, as it is not desirable to allow storage traffic to be dropped. For IP traffic, one or more higher-level protocols (e.g. TCP) may detect packets dropped by the network switch and resend the dropped packets.

In one embodiment, all packets entering a slice of the network switch that are subject to input thresholding may be assigned to one of N threshold groups and one of M flows of the slice, where N and M are positive integers. In one embodiment, N=16. In one embodiment, M=1024. In one embodiment, the assignment is made in one or more fields of the packet header (e.g. the GrpVcNum and FlowNum fields respectively). In one embodiment, threshold group assignment and/or flow assignment may be performed by a network processor of the network switch. In one embodiment, each of the N threshold groups may have its own set of M flows. In another embodiment, M flows may be shared among the N threshold groups, and any of the M flows may be used by any of the N threshold groups.

A definition of "threshold group" as used herein may include the notion of a structure for managing one or more data streams (e.g. a stream of packets) being received on the network switch using thresholding as described herein to control the allocation of resources (e.g. memory portions) to the one or more data streams. In the context of threshold groups, the definition of "flow" as used herein may include the notion of a structure to which incoming packets of the one or more data streams may be assigned to be managed within the threshold group. Thus, a flow within a threshold group may be empty, may include packets from one data stream, or may include packets from multiple data streams. Various parameters used in the implementation of the threshold group and flows of the threshold group may be maintained in hardware and/or software on the network switch.

Resources on the slice (e.g. packet descriptors and clusters) may be allocated among the threshold groups on the slice. Input thresholding may be used to prevent a particular flow within a threshold group from using up all of the resources that have been allocated for the threshold group. In one embodiment, each threshold group may be divided into a plurality of levels or regions of operation. In one embodiment, there are three such levels, and the three levels may be designated as "low", "medium" and "high". As resources are allocated and/or freed in the threshold group, the threshold group may dynamically move up or down in the levels of operation. Within each operating level, one or more different values may be used as level boundaries (thresholds) and resource limits for flows within the threshold group.

In one embodiment, registers may be used to store the various values (e.g. thresholds, maximums, etc.) used in implementing input thresholding. In one embodiment, at least a portion of these registers may be programmable registers to allow the modification of various input thresholding parameters. These registers may be used to control resource allocation and thresholding for the threshold groups within a slice. For each threshold group, a set of these registers may be available for controlling resource usage within the threshold group, for example, packet descriptor resource usage and cluster resource usage. In one embodiment, there is one set (e.g. 8) of registers used for packet descriptors for each threshold group, and one set (e.g. 8) of registers used for clusters in each threshold group. Thus, in one embodiment, there are 16 total registers for each threshold group and, for an embodiment with 16 threshold groups per slice, a total of 256 registers. These registers may include, but are not limited to:

GrpLimit—This register specifies the maximum number of clusters or packet descriptors that can be allocated for the threshold group.

GrpLevelLowToMed—This register stores the threshold used to determine when to cross from low level to medium operating level for the threshold group.

GrpLevelMedToHigh—This register stores the threshold used to determine when to cross from medium level to high operating level for the threshold group.

GrpLevelHighToMed—This register stores the threshold used to determine when to cross from high level to medium operating level for the threshold group.

GrpLevelMedToLow—This register stores the threshold used to determine when to cross from medium level to low operating level for the threshold group.

GrpLowMax—This register determines the value used to limit resource usage of flows for a particular threshold group when the threshold group is in the low operating level.

GrpMedMax—This register determines the value used to limit resource usage of flows for a particular threshold group when the threshold group is in the medium operating level.

GrpHighMax—This register determines the value used to limit resource usage of flows for a particular threshold group when the threshold group is in the high operating level.

In addition to the registers listed above, there may be another register on the slice that applies collectively to all threshold groups. Again there may be two of these registers, one for packet descriptors and one for clusters:

TotGrpLmt—This register specifies the maximum number of resources (e.g. packet descriptors or clusters) that can be allocated to all the threshold groups on the slice. In one embodiment, this register may be programmed with a value that is less than or equal to the sum of all the GrpLimit registers for all the different threshold groups on the slice. This register may be used in allowing high priority packets in an input thresholding embodiment.

The packet descriptor registers for threshold group 0 may be programmed with the exemplary values shown below. Note that the register names have a prefix of "Pdq" to identify them as registers associated with packet descriptors and the digit "0" to identify threshold group 0.

PdqGrp0Lmt=30
PdqTotGrpLmt=200
PdqGrp0LevelLowToMed=10
PdqGrp0LevelMedToHigh=20
PdqGrp0LevellighToMed=18
PdqGrp0LevelMedToLow=8
PdqGrp0LowMax=7
PdqGrp0MedMax=5
PdqGrp0HighMax=3

In addition there may be an N-deep RAM that may be used to track the total packet descriptors being used by each of the N threshold groups. Similarly there may be an M-deep RAM used to track the total packet descriptors being used by each of the M flows. Note that the total number of packet descriptors is equivalent to the total number of packets, since there is one packet descriptor used for each packet that enters the slice.

FIG. 15 illustrates one embodiment of input thresholding for a threshold group (threshold group 0, in this example) using multiple levels (e.g. 3 levels) to control resource allocation, and also illustrates some of the exemplary values listed above that may be used for controlling packet descriptor resource allocation using input thresholding. Even though FIG. 15 illustrates thresholding for packet descriptors, the same figure may be referred to in reference to clusters, as the input thresholding schemes are substantially similar for clusters and packet descriptors.

The cluster registers for threshold group 0 may be programmed with the exemplary values shown below. Note that the register names have a prefix of "Clm" to identify them as registers associated with clusters and the digit "0" to identify threshold group 0:

ClmGrp0Lmt=30
ClmTotGrpLmt=200
ClmGrp0LevelLowToMed=10
ClmGrp0LevelMedToHigh=20
ClmGrp0LevelHighToMed=18
ClmGrp0LevelMedToLow=8
ClmGrp0LowMax=7
ClmGrp0MedMax=5
ClmGrp0HighMax=3

In addition, there may be an N-deep RAM that may be used to track the total clusters being used by each of the N threshold groups. Similarly there may be an M-deep RAM used to track the total clusters being used by each of the M flows.

It is important to note that, while the exemplary values given above for packet descriptor registers and cluster registers are identical, it is not required that the input thresholding values for packet descriptors and clusters be identical.

The following is an example of input thresholding using the exemplary values given above for clusters. Threshold group 0 is initially in the low operating level. A first packet comes into the slice and is assigned to threshold group 0 and flow 0. The first packet uses six clusters. The threshold group remains in the low operating level. A second packet subsequently comes into the slice and is also assigned to threshold group 0, flow 0. The second packet uses one cluster. Flow 0 is now using a total of seven clusters. The next packet that comes in and assigned to threshold group 0, flow 0 is dropped because the threshold group's current maximum number of clusters that may be used by a flow (as given by the register ClmGrp0LowMax) is seven, and seven clusters are currently in use by flows in the threshold group. A third packet that uses four clusters comes into the slice and is assigned to threshold group 0, flow 1. The third packet is admitted because flow 1's cluster usage is below the current maximum (7). However, now the threshold group moves to the medium operating level, because 11 total clusters are in use by flows in the threshold group (7 by flow 0 and 4 by flow 1). The low to medium level crossing happens when the number of clusters in use by all flows in the threshold group is greater than the threshold level in the ClmGrp0LevelLowToMed register (initialized to 10 in this example).

Now in the medium operating level, the threshold group's new maximum number of clusters that can be used by a flow is 5 (determined by the ClmGrp0MedMax register). A fourth packet now comes into the slice and is assigned to threshold group 0, flow 1. This packet is allowed to allocate one cluster, since four clusters have already been allocated for flow 1 and the maximum allowed is 5. Subsequent cluster requests for threshold group 0, flow 1 packets will be denied (unless cluster resources are freed prior to the subsequent cluster requests). Packets that come into the slice and assigned to flows other than flows 0 and 1 in threshold group 0 will be allowed to use up to five clusters each, but may be denied the clusters if allocating resources to them will exceed resource limits for the flow to which they are assigned. Once the threshold group moves from the medium to the high operating level, the new maximum number of clusters allowed per flow will be 3 (determined by the ClmGrp0HighMax register). The medium to high level crossing will happen when the number of clusters in use by the threshold group is greater than the threshold level of the ClmGrp0LevelMedToHigh register (initialized to 20 in this example). Packets denied clusters may be dropped from the network switch.

If new packets continue to be allocated to flows in threshold group 0, cluster usage may increase for the threshold group until it approaches or reaches the maximum cluster usage allowed for the threshold group (e.g. ClmGrp0Lmt, initialized to 30 in this example). Packets assigned to flows in the threshold group will not be allocated clusters, and thus may be dropped, if the allocation would cause the threshold group usage to exceed this maximum.

Input thresholding for packet descriptor resource allocation in a threshold group may be handled similarly to cluster input thresholding as described in the above example. Note, however, that each packet assigned to a threshold group and flow uses only one packet descriptor.

As packets assigned to a threshold group are read out of packet memory, allocated resources (including packet descriptor and cluster resources) in the threshold group may be freed. When the resources are freed, the threshold group may move down from the high to medium and subsequently to low levels of operation. In one embodiment, hysteresis may be used at level crossings by overlapping the upper thresholds of lower levels with the lower thresholds of higher levels (shown by the non-shaded portions in FIG. 15). The hysteresis may help prevent the threshold group from bouncing in and out of the different levels of operation as resources are dynamically allocated and freed. For example, the high to medium level crossing will happen when the number of clusters in use by the threshold group drops to less than the threshold level of the ClmGrp0LevelHighToMed register (initialized to 18 in this example), but the threshold group will not cross back into the high operating level until the number of clusters in use by the threshold group rises above the threshold level in the ClmGrp0LevelMedToHigh register (initialized to 20 in this example.

The method of input thresholding as described herein may help to prevent any one flow from consuming resources at the expense of other flows. As a threshold group ties up more resources, the level thresholds may be dynamically adjusted to become tighter. As the flows in the threshold group are getting closer to the threshold group allocation limit, it may be desirable to limit the resources that can be consumed by any one flow. This may allow a more equitable distribution of resources across the flows.

Figure 16:
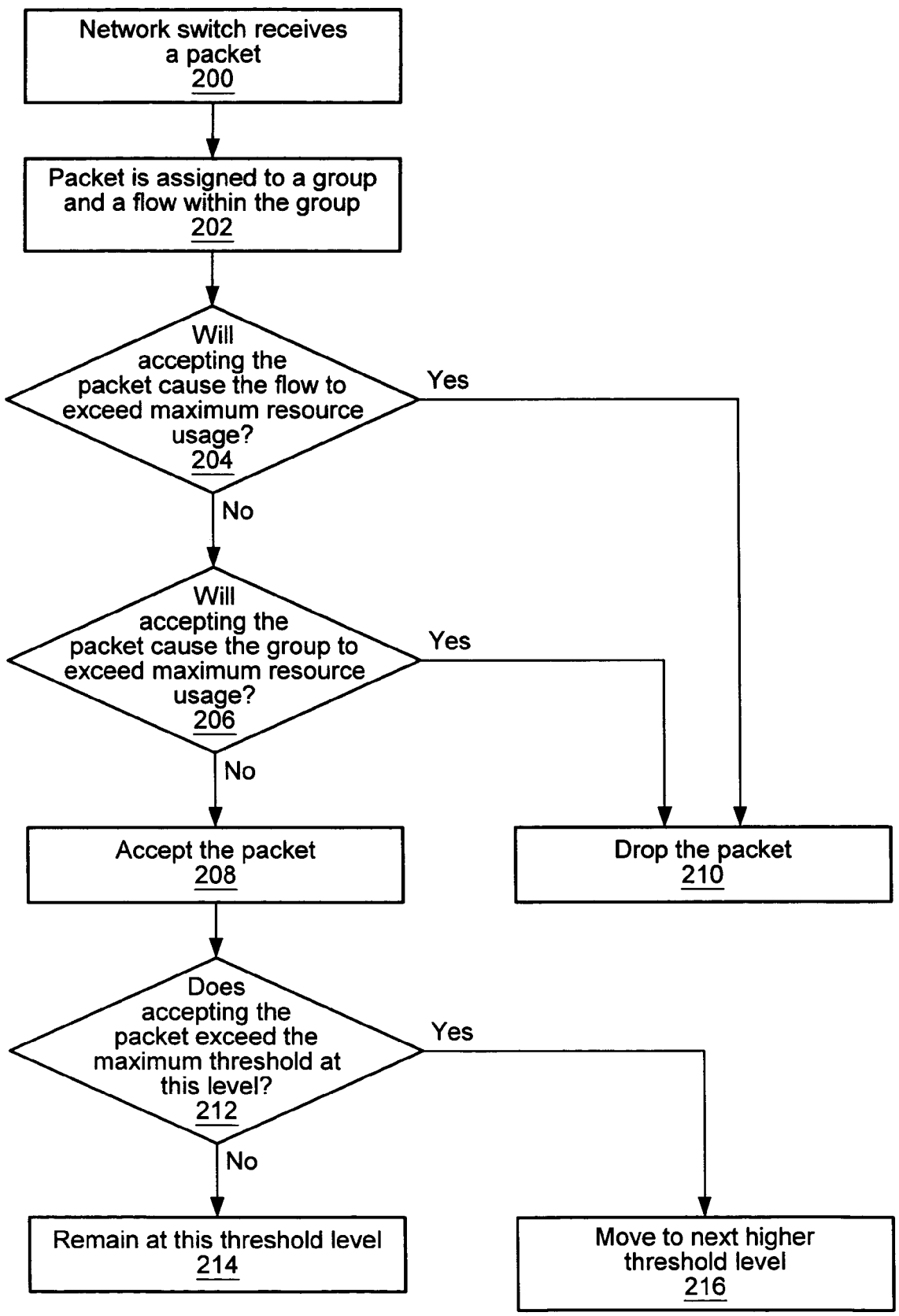
FIG. 16 is a flowchart illustrating a method of input thresholding packets according to one embodiment.

FIG. 16 is a flowchart illustrating a method of input thresholding packets according to one embodiment. The network switch first receives a packet as indicated at 200. The packet is assigned to a threshold group, and to a flow within the threshold group, as indicated at 202. In one embodiment, a network processor may perform the assigning of the packet to the flow and threshold group. The threshold group is operating at a current threshold level, at which the flows in the threshold group are limited to a maximum number of resources (e.g. clusters and/or packet descriptors). At 204, a determination is made as to whether accepting the packet will cause the flow to which it is assigned to exceed the maximum number of resources for flows at the current operating level. If accepting the packet will cause the flow to exceed the maximum, then the packet will be dropped as indicated at 210, and no resources (e.g. packet descriptors and clusters) are allocated for the packet. If accepting the packet will not cause the flow to exceed the maximum, then the packet has passed the first hurdle.

Next, a determination is made as to whether accepting the packet will cause the threshold group to exceed a maximum resource usage for the threshold group as indicated at 206. In other words, will the total resources used by all flows in the threshold group exceed a preprogrammed maximum resource allotment for the threshold group? If accepting the packet will cause the threshold group to exceed the maximum, then the packet will be dropped as indicated at 210, and no resources are allocated for the packet. If accepting the packet will not cause the flow to exceed the maximum, then the packet is accepted in the network switch as indicated at 208, and the necessary resources (e.g. a packet descriptor and one or more clusters) for storing the packet in the slice are allocated for the packet.

Next, a determination is made as to whether accepting the packet causes the threshold group resource usage to exceed the maximum threshold at this level as indicated at 212. If the maximum threshold level is exceeded, then the threshold group moves to the next higher threshold level as indicated at 216. If the threshold group is still at or below the maximum threshold level, then the threshold group remains at the current threshold level as indicated at 214. Note that, if enough resources are used, the threshold group may move up more than one threshold level.

FIG. 17 is a flowchart illustrating a method of moving a threshold group to a lower threshold level according to one embodiment. As indicated at 220, one or more previously accepted packets may be released. Releasing the packets results in resources (e.g. packet descriptors and clusters) in use by the packets being freed for use in receiving other packets. As indicated at 222, a determination is made as to whether freeing the resources drops resource usage of the threshold group below the minimum threshold level at the current level. If the threshold group has not dropped below the minimum resource usage, then the threshold group remains at the current level as indicated at 224. If the threshold group has dropped below the minimum resource usage, then the threshold group moves to the next lower threshold level as indicated at 226. Note that, if enough resources are released, the threshold group may drop more than one threshold level.

Note that the two methods described above are merely examples. The methods may be implemented in software, hardware, or a combination thereof. The order of method may be changed, and various steps may be added, reordered, combined, omitted, modified, etc. For example, in FIG. 16, in one embodiment the threshold group may be moved into a different threshold level prior to accepting the packet.

High-Priority Packets and Input Thresholding

In general, thresholded packets are subject to being dropped within the slice at the input port when the resource allocation limits (associated with the threshold group and the threshold level) are exceeded. In one embodiment, the network switch may accept high priority traffic. In one embodiment, specific ports and/or resources in a slice may be allocated for servicing high priority traffic. In general, high priority traffic may not require as much resources as low priority traffic, as high-priority packets may not spend as much time in the fabric as low priority traffic. In one embodiment, high priority packets may not be subjected to the input thresholding as are low priority packets. Input thresholding may be used to drop lower priority traffic so that the resources are available for use by the higher priority traffic, and thus to limit the possibility of high priority packets being dropped. In one embodiment, high priority traffic may be distinguished by a bit or bits being set in the packet header. Other embodiments may use other indicators for high priority packets. High priority packets may "steal" resources away from what has been allocated for all the threshold groups as a whole within the slice. A high priority packet may be admitted into a slice if at least a single cluster and packet descriptor are available and if the total usage of resources by all threshold groups is less than the limit for threshold group usage, for example, as defined in the TotGrpLmt register. The TotGrpUsage register may be incremented to reflect resource(s) allocated for an admitted high priority packet. In one embodiment, the usage registers used for input thresholding may not be adjusted for high priority packets, as the high priority packets are not subject to input thresholding.

Resource Tracking

In one embodiment, a slice in the network switch tracks resources (e.g. packet descriptors and clusters) that are being used for packets admitted to the slice. In one embodiment, for input thresholding, counts are maintained within the slice for the number of packet descriptors and clusters that are in use by the following:

Each of the N threshold groups.

Each one of the M flows within each of the N threshold groups.

The N threshold groups as a whole.

As packet descriptors and clusters are successfully allocated for incoming packets, these counts may be incremented. When the packet is read out of packet memory or discarded, these counts may be decremented. Packet descriptor counts may be decremented by 1 when a packet is read out and cluster count may be decremented by the number of clusters that were in use by the packet, which is a function of the size of the stored packet.

Several descriptors (e.g. registers) may be used to keep track of programmed thresholds, maximums, minimums, etc. (such as the values illustrated in FIG. 15) in a network switch and to keep track of current resource usage for flows and threshold groups in the network switch. FIG. 18 illustrates an input flow descriptor that may be used to track resource usage for flows in one embodiment of the network switch. FIG. 19 illustrates a threshold group descriptor that may be used to track the current threshold level for each threshold group in one embodiment of the network switch. FIG. 20 illustrates a threshold level descriptor that may be used to store currently programmed resource usage maximums and thresholds for each level of each threshold group in one embodiment of the network switch. One embodiment may maintain two sets of registers for each threshold group, with one set for packet descriptors and one set for clusters.

When a non-high priority packet comes in to the slice and is assigned to a threshold group and flow, the input thresholding admission logic may check to see if enough resources are available for the packet. The logic may look at the resources allocated and the resources currently in use for the particular threshold group and flow to which the incoming packet is assigned. The packet may be dropped if not enough resources are available. In one embodiment, the input thresholding admission logic may include two components—one for packet descriptors and another for clusters.

For the packet to be admitted, successful allocation signals must be asserted by both components of the logic to assure there are enough resources for the packet descriptor and one or more clusters required by the packet. Packets generally may include one packet descriptor and one or more clusters. The following describes some conditions under which these allocation signals are asserted.

In one embodiment, a packet descriptor may be successfully allocated for a packet assigned to a threshold group and flow within the slice if the following conditions are met:

- A packet descriptor is available. There are a total of X packet descriptors available on the slice. In one embodiment, X=2047. If resources are allocated correctly, this condition will be met. However, if the registers for allocation are not programmed correctly, the slice may run out of packet descriptors for allocation.
- The number of packet descriptors in use by the threshold group is less than the maximum number allocated for the threshold group, for example, as specified in the GrpLmt register.
- The number of packet descriptors in use by all threshold groups is less than the total number allocated for all threshold groups, for example, as specified in the TotGrpLmt register. This condition may not be met if high priority packets are currently using resources from the threshold groups.
- The number of packet descriptors in use by the flow is less than the threshold group's current maximum number of packet descriptors that may be used by a flow. In one embodiment, the current maximum is derived from the threshold group's current operating level and the values programmed in the registers for packet registers.

Note that, in some embodiments, one or more conditions other than the above listed conditions may be applied to the allocation of packet descriptors.

Clusters may be allocated for incoming packets in one or more situations. Two situations and the criteria that may be applied for successful allocation of clusters in the situations are described below.

Allocate the first cluster for the packet. In one embodiment, a first cluster may be successfully allocated for the packet if the following conditions are met:

- A cluster is available. There are a total of Y clusters available on the slice. In one embodiment, Y=16383. If resources are allocated correctly, this condition may be met. However, if the registers for the allocation of clusters are not programmed correctly, the slice may run out of clusters for allocation.
- The number of clusters in use by the threshold group is less than the maximum number allocated for the threshold group, for example, as specified in the GrpLmt register.
- The number of clusters in use by all threshold groups is less than the total number that is allocated for all threshold groups, for example, as specified in the TotGrpLmt register. This condition may not be met if high priority packets are currently using resources from the threshold groups.
- The number of clusters in use by the flow is less than the threshold group's current maximum number of clusters that may be used by a flow. In one embodiment, the current maximum is derived from the threshold group's current operating level and the values programmed in the registers for clusters.

Allocate subsequent clusters for the packet. In one embodiment, one or more subsequent clusters may be successfully allocated if the following conditions are met:

- A cluster is available. If resources are allocated correctly, this condition may be met. However, if the registers for the allocation of clusters are not programmed correctly, the slice may run out of clusters for allocation.
- The number of clusters in use by the threshold group is less than the maximum number allocated for the threshold group, for example, as specified in the GrpLmt register.
- The number of clusters in use by all threshold groups is less than the total number that is allocated for all threshold groups, for example, as specified in the TotGrpLmt register. This condition may not be met if high priority packets are currently using resources from the threshold groups.

The situations for providing (e.g. allocating and/or assigning pre-allocated clusters) the first cluster and for providing subsequent clusters for the packet in the embodiment described above are handled differently in that input thresholding (e.g. the number of clusters in use by the flow is less than the threshold group's current maximum number of clusters that may be used by a flow) is applied when providing the first cluster for the packet and not when providing subsequent clusters for the packet.

Dynamic Late-Dropping of Packets

In one embodiment, a packet subject to input thresholding may be accepted into a slice and assigned to a threshold group and flow even if, at the time of arrival of the packet, there are not enough resources (e.g. clusters) available in the threshold group, and/or slice to receive the entire packet. This partial receipt of a packet is allowed because of the possibility of additional resources becoming available between the time of receipt of and resource allocation for a portion of the packet and receipt of subsequent portions of the packet.

There must be at least one packet descriptor available for a packet to be accepted. However, a first portion of the packet may be accepted even if, after the allocation of one or more clusters for the packet in the threshold group and flow to which the packet is assigned, there are not enough clusters available for receipt of the entire packet. Likewise, a second portion of the packet may be accepted even though there are not enough clusters available for subsequent portions of the packet, and so on, until, if clusters become available in time for receipt of each portion of the packet, the entire packet may be received.

In one embodiment, if the packet is denied the allocation of a cluster or clusters after one or more resources (e.g. a packet descriptor and one or more clusters) are successfully allocated, the packet descriptor for the packet may be marked to be dropped, thus indicating that the packet is a partial packet. In one embodiment, there is a 1-bit field in the packet descriptor that is set to indicate the packet is to be dropped. In one embodiment, an error indicator may be placed at the end of the received portion of the packet that is to be dropped. In one embodiment, when a packet that is marked to be dropped is scheduled for reading by the output port, it will be discarded. The high-level protocol in which the packet was sent (e.g. TCP) may detect that the network switch dropped the packet and resend the dropped packet.

Prior art systems typically use a static method for accepting packets that makes the "keep-or-drop" decision at the time of initial admission of the packet. Using the dynamic, late-dropping method that postpones the keep-or-drop decision as described above is advantageous in that it allows a packet to be accepted into the network switch even if, at the time of arrival of the first portion of the packet, there are not enough resources (e.g. clusters) available to receive the entire packet. Thus, if resources become available (e.g. cluster are freed) prior to reception of other portions of the packet, the packet may be successfully received in its entirety. Otherwise, the partially received packet may be marked to be dropped, and later may be discarded. In one embodiment, the output port to which the packet is assigned may detect the packet is marked to be dropped and discard the packet. This method of late-dropping packets may result in higher bandwidth utilization by the network switch in many situations due to fewer rejected packets.

Figure 21:
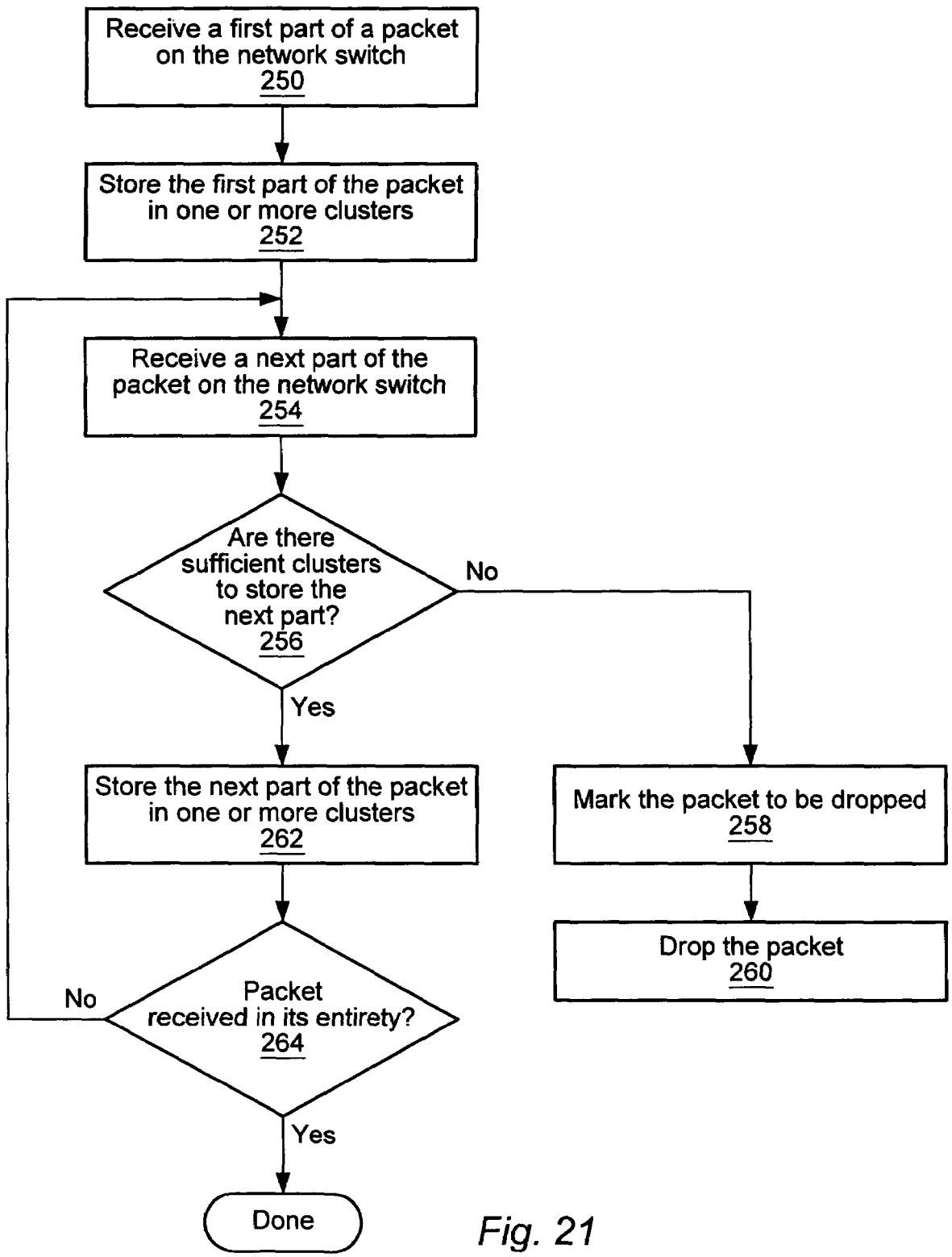
FIG. 21 is a flowchart illustrating a method for receiving partial packets according to one embodiment.

FIG. 21 is a flowchart illustrating a method for receiving partial packets according to one embodiment. As indicated at 250, a first portion of a packet may be received on the network switch. At 252, the first portion of the packet may be stored in one or more clusters on the network switch. In one embodiment, the assignment of clusters to the packet may be controlled using input thresholding as described above. When the first portion of the packet is received and/or stored, there may be insufficient resources (e.g. clusters) available to store the complete packet when received. As indicated at 254, a next portion of the packet may be subsequently received. At 256, it is determined if there are sufficient clusters available to store the next portion of the packet received at 254. If there are not enough clusters, then the packet may be marked to be dropped from the network switch as indicated at 258. In one embodiment, a bit or bits in the packet header and/or packet descriptor may be set to indicate the packet is to be dropped. The network switch may subsequently drop the packet as indicated at 260. In one embodiment, the output port of the network switch drops the partial packet when it examines the packet and determines that the packet is marked to be dropped.

If there are enough clusters currently available to store the received next portion of the packet, then the next portion of the packet may be stored in one or more clusters on the network switch as indicated at 262. If there were not enough clusters available when the first portion of the packet was received and/or stored to store the next portion, then packets may have been freed from the network switch prior to attempting to store the next portion of the packet. As indicated at 264, if the packet is not yet entirely received, steps 254–264 of the method may be repeated as necessary until the entire packet is received or until the partially received packet is marked to be dropped due to insufficient clusters for storing a received portion of the packet.

Note that the method described above is merely an example. The method may be implemented in software, hardware, or a combination thereof. The order of method may be changed, and various steps may be added, reordered, combined, omitted, modified, etc. For example, a step may be added prior to 250 wherein the incoming packet is assigned to a threshold group and flow.

The mechanism described above for providing packet descriptors and clusters may be used if the packet is fully stored before being forwarded. In one embodiment, for early-forwarded packets, the packet is not allowed to run out of clusters once the first cluster has been successfully allocated. In one embodiment, this is accomplished by making sure that the packet is not early forwarded if enough clusters are not available on the slice, and thus there is a possibility that the packet will run out of clusters while being early-forwarded. In one embodiment, the method of late-dropping packets as described above may be disabled to allow packets to be early-forwarded. In one embodiment, if a packet cannot be early forwarded, then it may be subject to input thresholding. In one embodiment, for each threshold group, a register may be used to specify a minimum number of clusters that must be available for the threshold group before packets of the threshold group may be early forwarded. In one embodiment, this register may be programmed with a value equal to four times the maximum packet size expected for that threshold group. In one embodiment, for a packet to be early forwarded, the total clusters available for all threshold groups as well as the total clusters available for the packet's assigned threshold group must be greater than or equal to the value programmed in this register.

In embodiments that support virtual channels, packets that come in on a virtual channel (for example, if GrpVcNum[4]=0) are subject to credit based flow control and are thus not subject to input thresholding. If the flow control registers associated with a virtual channel are set up properly and the link partners follow the prescribed credit based behavior, these packets will always have resources available for them. Hence these packets may never be dropped. However if things are not configured correctly, these packets may be dropped as defined below.

In one embodiment that supports virtual channels, there are K virtual channels available per port. In one embodiment, K=8. In one embodiment, the slice keeps track of the resources (e.g. packets and clusters) in use by every virtual channel on every port of the slice. Resources may be allocated to every virtual channel on every port using programmable registers. When a packet comes into the slice, the packet admission logic may check to see whether the resources in use by the virtual channel to which the packet belongs are less than the allocated limits. Both packet descriptors and clusters may be checked. If either of these checks fail, the packet may be dropped. The packet may also be dropped if either a packet descriptor or a cluster is not available. Early Forwarding may be allowed for virtual channel packets if the total available resources for the virtual channel on the port are greater than or equal to a programmable value (e.g. ClmMinFreeClustersEarlyFwdVC_x_Port_y, where x is the virtual channel number and y is the port number). Every virtual channel on every port may have a different packet size negotiated with its link partner. Hence, in one embodiment, there are individual registers for each virtual channel on each port.

A system and method for the input thresholding of packets in a network switch have been disclosed. While the embodiments described herein and illustrated in the figures have been discussed in considerable detail, other embodiments are possible and contemplated. It should be understood that the drawings and detailed description are not intended to limit the invention to the particular forms disclosed, but on the contrary, the intention is to cover all modifications, equivalents, and alternatives falling within the spirit and scope of the present invention as defined by the appended claims.

What is claimed is:

1. A method comprising:
receiving a first packet on a network switch, wherein the network switch comprises one or more threshold groups, wherein each of the one or more threshold groups comprises a plurality of flows;
assigning the first packet to a first flow of a first threshold group of the one or more threshold groups, wherein the first threshold group is at a first operating level of a plurality of operating levels;

if storing the first packet in a memory of the network switch would not cause the first flow to exceed a flow resource limit at the first operating level of the first threshold group, storing the first packet in the memory of the network switch;

if storing the first packet in the memory of the network switch would cause the first flow to exceed the flow resource limit at the first operating level of the first threshold group, discarding the first packet from the network switch;

wherein a flow resource limit at each of the plurality of operating levels is a maximum number of resources that any one of the plurality of flows is allowed to use while the first threshold group is at that particular operating level;

if the first packet is stored in the memory of the network switch, and if said storing the first packet causes the first threshold group to exceed a resource maximum threshold for the first operating level of the first threshold group, changing the first threshold group to a second operating level;

wherein a resource maximum threshold for each of the plurality of operating levels is a maximum combined number of resources that the plurality of flows is allowed to use while the first threshold group is at that particular operating level;

removing a previously stored packet from the first threshold group; and if said removing the previously stored packet causes the first threshold group to drop below a resource minimum threshold for the second operating level of the first threshold group, changing the first threshold group to the first operating level;

wherein a resource minimum threshold for each of the plurality of operating levels is a minimum combined number of resources that the plurality of flows is allowed to use at that particular operating level.

2. The method as recited in claim 1, wherein a flow resource limit at the second operating level of the first threshold group is less than the flow resource limit at the first operating level of the first threshold group.

3. The method as recited in claim 1, wherein the resource minimum threshold for the second operating level of the first threshold group is lower than the resource maximum threshold for the first operating level of the first threshold group.

4. The method as recited in claim 1, wherein there is hysteresis between the first operating level and the second operating level of the first threshold group.

5. The method as recited in claim 1, further comprising:
if storing the first packet would not cause the first threshold group to exceed a threshold group resource limit for the first threshold group, storing the first packet in the memory of the network switch; and if storing the first packet would cause the first threshold group to exceed the threshold group resource limit for the first threshold group, discarding the first packet from the network switch;

wherein the threshold group resource limit for the first threshold group is a maximum combined number of resources that the plurality of flows are allowed to use in the first threshold group.

6. The method as recited in claim 1, wherein the flow resource limit of the first threshold group ranges from a largest number to a progressively smaller number from a lowest operating level to a highest operating level of the plurality of operating levels respectively.

7. The method as recited in claim 1, wherein the plurality of operating levels include a low operating level, a medium operating level, and a high operating level, and wherein the flow resource limit of the first threshold group ranges from a largest flow resource limit to a smallest flow resource limit from the low operating level to the high operating level respectively.

8. The method as recited in claim 1, wherein the resources are clusters.

9. The method as recited In claim 1, wherein the resources are packet descriptors.

10. The method as recited in claim 1, wherein the resources include packet descriptors and clusters.

11. The method as recited in claim 1, wherein the first packet is received by the network switch on a port configured to receive Gigabit Ethernet traffic not using control frame-based flow control.

12. A method comprising:
receiving a first one or more packets on a network switch, wherein the network switch comprises a plurality of threshold group, wherein each threshold group comprises a plurality of flows, and wherein each threshold group is configured to operate in one of a plurality of operating levels from a lowest operating level to a highest operating level:

assigning the first one or more packets to a first flow of a first threshold group of the plurality of threshold groups, wherein the first threshold group is at a current operating level, wherein each of the one or more packets requires the use of one or more resources on the network switch wherein each flow is allowed at most a flow resource limit of resources on the network switch at each operating level of the plurality of threshold groups, and wherein the flow resource limit ranges from a largest number to a progressively smaller number from the lowest operating level to the highest operating level, respectively;

removing a previously stored one or more packets from the first threshold group; and changing the first threshold group to a next lower operating level, if said removing the previously stored one or more packets causes the first threshold group to drop below a resource minimum threshold for the current operating level of the first threshold group;

wherein a resource minimum threshold for each of the plurality of operating levels is a minimum combined number of resources that the plurality of flows is allowed to use at that particular operating level; and determining if storing the first one or more packets in a memory of the network switch would cause the first flow to exceed a flow resource limit at the current operating level of the first threshold group;

if storing the first one or more packets in the memory of the network switch would not cause the first flow to exceed the flow resource limit at the current operating level of the first threshold group, storing the first one or more packets in the memory of the network switch: and if storing the first one or more packets in the memory of the network switch would cause the first flow to exceed the flow resource limit at the current operating level of the first threshold group, discarding the first one or more packets from the network switch.

13. The method as recited in claim 12, further comprising:
if the first one or more packets are stored In the memory of the network switch, and if said storing causes the first threshold group to exceed a resource maximum threshold for the current operating level of the first threshold group, changing the first threshold group to a next higher operating level;
wherein a resource maximum threshold for each of the plurality of operating levels is a maximum combined number of resources that the plurality of flows is allowed to use at that particular operating level; and
wherein a flow resource limit at the next higher operating level is less than the flow resource limit at the current operating level.

14. The method as recited in claim 12, wherein the resource minimum threshold for the current operating level of the first threshold group is lower than the resource maximum threshold for the next lower operating level of the first threshold group to provide hysteresis between adjacent operating levels of the first threshold group.

15. The method as recited in claim 12, further comprising:
if storing the first one or more packets would not cause the first threshold group to exceed a threshold group resource limit for the first threshold group, storing the first one or more packets in the memory of the network switch; and
if storing the first one or more packets would cause the first threshold group to exceed the threshold group resource limit for the first threshold group, discarding the first one or more packets from the network switch;
wherein the threshold group resource limit for the first threshold group is a maximum combined number of resources that the plurality of flows are allowed to use in the first threshold group.

16. The method as recited in claim 12, wherein the plurality of operating levels include a low operating level, a medium operating level, and a high operating level, and wherein the flow resource limit of the first threshold group ranges from a largest flow resource limit to a smallest flow resource limit from the low operating level to the high operating level respectively.

17. The method as recited in claim 12, wherein the resources are one of packet descriptors and clusters.

18. The method as recited in claim 12, wherein the first one or more packets are received by the network switch on a port configured to receive Gigabit Ethernet traffic not using control frame-based flow control.

19. A method comprising:
receiving a plurality of bytes as part of a first data stream on a network switch comprising a memory, wherein the network switch is at a first operating level of a plurality of operating levels, and wherein the network switch is operable to concurrently receive a plurality of data streams;
if storing the plurality of bytes of the first data stream in a first location of a plurality of locations of the memory of the network switch would not cause the first data stream to exceed a memory usage limit for data streams at the first operating level, storing the plurality of bytes at the first location of the memory of the network switch;
if the plurality of bytes is stored in the first location of the memory of the network switch, and If said storing the plurality of bytes exceeds a memory usage maximum threshold for the first operating level, changing the network switch to a second operating level;
wherein the memory usage maximum threshold for the first operating level is a maximum amount of the memory that the plurality of data streams is allowed to use while the network switch is at the first operating level; and
wherein a memory usage limit at the second operating level is less than the memory usage limit at the first operating level; and
if storing the plurality of bytes of the first data stream in the first location of the memory of the network switch would cause the first data stream to exceed the memory usage limit for data streams at the first operating level, discarding the plurality of bytes from the network switch;
wherein a memory usage limit at each of the plurality of operating levels is a maximum amount of the memory that any one data stream is allowed to use while at that particular operating level.

20. The method as recited in claim 19, further comprising:
removing a previously stored plurality of bytes from the memory; and
if said removing causes the network switch to drop below a memory usage minimum threshold for the second operating level, changing the network switch to the first operating level;
wherein the memory usage minimum threshold for the second operating level is a minimum amount of memory that the plurality of data streams are allowed to use at the second operating level.

21. The method as recited in claim 19, wherein there is hysteresis between the first operating level and the second operating level.

22. The method as recited in claim 19, wherein the plurality of locations in the memory are clusters.

23. The method as recited in claim 19, wherein the plurality of locations in the memory are packet descriptors.

24. The method as recited in claim 19, wherein the first data stream received by the network switch Is a Gigabit Ethernet data stream not using control frame-based flow control.

25. A method comprising:
receiving a plurality of bytes as part of a first data stream on a network switch comprising a memory, wherein the network switch is at a first operating level of a plurality of operating levels; and wherein the network switch is operable to concurrently receive a plurality of data streams;
if storing the plurality of bytes of the first data stream in a first location of a plurality of locations of the memory of the network switch would not cause the first data stream to exceed a memory usage limit for data streams at the first operating level, storing the plurality of bytes at the first location of the memory of the network switch; and
if storing the plurality of bytes of the first data stream in the first location of the memory of the network switch would cause the first data stream to exceed the memory usage limit for data streams at the first operating level, discarding the plurality of bytes from the network switch;
wherein a memory usage limit at each of the plurality of operating levels is a maximum amount of the memory that any one data stream is allowed to use while at that particular operating level; and
if storing the plurality of bytes would exceed a total memory usage limit for the network switch, discarding the plurality of bytes from the network switch;

wherein the total memory usage limit is a maximum amount of the memory of the network switch that the plurality of data streams are allowed to use.

26. A network switch comprising:
one or more ports configured to receive input packets for the network switch;
a random access memory comprising a plurality of memory portions configured for use in storing packets in the network switch; and
packet admission logic coupled between a first port of the one or more ports and the random access memory, wherein the packet admission logic comprises one or more threshold groups, wherein each of the one or more threshold groups comprises a plurality of flows, and wherein the packet admission logic is configured to:
receive a first packet on a first port of the one or more ports;
assign the first packet to a first flow of a first threshold group of the one or more threshold groups, wherein the first threshold group is at a first operating level;
determine if storing the first packet in a first one or more memory portions would cause the first flow to exceed a flow memory portion limit at the first operating level of the first threshold group;
store the first packet in the first one or more memory portions if said determining finds that storing the first packet in the first one or more memory portions of the plurality of memory portions would not cause the first flow to exceed the flow memory portion limit at the first operating level of the first threshold group; and
discard the first packet from the network switch if said determining finds that storing the first packet in the first one or more memory portions would cause the first flow to exceed the flow memory portion limit at the first operating level of the first threshold group;
wherein a flow memory portion limit at each of the plurality of operating levels is a maximum number of memory portions that any one of the plurality of flows is allowed to use at that particular operating level.

27. The network switch as recited in claim 26, wherein the packet admission logic is further configured to:
if the first packet is stored in the first one or more memory portions, change the first threshold group to a second operating level if said storing causes the first threshold group to exceed a memory portion maximum threshold for the first operating level of the first threshold group;
wherein a memory portion maximum threshold for each of the plurality of operating levels is a maximum combined number of memory portions that the plurality of flows are allowed to use while the first threshold group is at that particular operating level;
wherein a flow memory portion limit at the second operating level of the first threshold group is less than the flow memory portion limit at the first operating level of the first threshold group.

28. The network switch as recited in claim 27, wherein the packet admission logic is further configured to:
remove a previously stored packet from the first threshold group; and
change the first threshold group to the first operating level if said removing the previously stored packet causes the first threshold group to drop below a memory portion minimum threshold for the second operating level of the first threshold group;
wherein a memory portion minimum threshold for each of the plurality of operating levels is a minimum combined number of memory portions that the plurality of flows are allowed to use at that particular operating level.

29. The network switch as recited in claim 28, wherein the memory portion minimum threshold for the second operating level of the first threshold group is lower than the memory portion maximum threshold for the first operating level of the first threshold group.

30. The network switch as recited in claim 26, wherein the packet admission logic is further configured to:
determine If storing the first packet in the first one or more memory portions would cause the first threshold group to exceed a threshold group memory portion limit for the first threshold group, storing the first packet In the memory of the network switch;
store the first packet In the first one or more memory portions if said determining finds that storing the first packet in the first one or more memory portions of the plurality of memory portions would not cause the first threshold group to exceed the threshold group memory portion limit for the first threshold group; and
discard the first packet from the network switch if said determining finds that storing the first packet in the first one or more memory portions would cause the first threshold group to exceed the threshold group memory portion limit for the first threshold group;
wherein the threshold group memory portion limit for the first threshold group is a maximum combined number of memory portions that the plurality of flows are allowed to use in the first threshold group.

31. The network switch as recited in claim 26, wherein the flow memory portion limit of the first threshold group ranges from a largest number to a progressively smaller number from a lowest operating level to a highest operating level of the plurality of operating levels respectively.

32. The network switch as recited in claim 26, wherein the memory portions are clusters.

33. The network switch as recited in claim 26, wherein the memory portions are packet descriptors.

34. The network switch as recited in claim 26, wherein the first port is configurable to receive Gigabit Ethernet traffic not using control frame-based flow control.

35. A network switch comprising:
one or more ports configured to receive input packets for the network switch;
a random access memory comprising a plurality of memory portions configured for use in storing packets in the network switch; and
packet admission logic coupled between a first port of the one or more ports and the random access memory, wherein the packet admission logic comprises a plurality of threshold groups, wherein each threshold group comprises a plurality of flows, wherein each threshold group is configured to operate in one of a plurality of operating levels from a lowest operating level to a highest operating level, wherein each flow is allowed at most a flow memory portion limit of memory portions on the network switch at each operating level of the threshold group, and wherein the flow memory portion limit ranges from a largest number to a progressively smaller number from the lowest operating level to the highest operating level respectively, and wherein the packet admission logic is configured to;
receive a first one or more packets on a first port of the one or more ports;

assign the first one or more packets to a first flow of a first threshold group of the plurality of threshold groups, wherein the first threshold group is at a current operating level, and wherein each of the one or more packets requires the use of one or more of the plurality of memory portions on the network switch;

determine if storing the first one or more packets in a first one or more memory portions of the plurality of memory portions would cause the first flow to exceed a flow memory portion limit at the current operating level of the first threshold group;

store the first one or more packets in the first one or more memory portions if said determining finds that storing the first one or more packets in the first one or more memory portions of the plurality of memory portions would not cause the first flow to exceed the flow memory portion limit at the current operating level of the first threshold group; and discard the first one or more packets from the network switch if said determining finds that storing the first one or more packets in the first one or more memory portions of the plurality of memory portions would cause the first flow to exceed the flow memory portion limit at the current operating level of the first threshold group.

36. The network switch as recited in claim 35, wherein the packet admission logic is further configured to:

if the first one or more packets are stored in the first one or more memory portions, change the first threshold group to a next higher operating level if said storing causes the first threshold group to exceed a memory portion maximum threshold for the current operating level of the first threshold group;

wherein a memory portion maximum threshold for each of the plurality of operating levels is a maximum combined number of memory portions that the plurality of flows are allowed to use at that particular operating level; and wherein a flow memory portion limit at the next higher operating level is less than the flow memory portion limit at the current operating level.

37. The network switch as recited in claim 35, wherein the packet admission logic is further configured to:

remove a previously stored one or more packets from the first threshold group; and change the first threshold group to a next lower operating level if said removing the previously stored one or more packets causes the first threshold group to drop below a memory portion minimum threshold for the current operating level of the first threshold group;

wherein a memory portion minimum threshold for each of the plurality of operating levels is a minimum combined number of memory portions that the plurality of flows are allowed to use at that particular operating level.

38. The network switch as recited in claim 35, wherein the packet admission logic is further configured to:

determine if storing the first one or more packets in the first one or more memory portions would cause the first flow to exceed a threshold group memory portion limit for the first threshold group;

store the first one or more packets in the first one or more memory portions if said determining finds that storing the first one or more packets would not cause the first flow to exceed the threshold group memory portion limit for the first threshold group; and discard the first one or more packets from the network switch if said determining finds that said storing the first one or more packets would cause the first flow to exceed the threshold group memory portion limit for the first threshold group;

wherein the threshold group memory portion limit for the first threshold group is a maximum combined number of memory portions that the plurality of flows are allowed to use in the first threshold group.

39. The network switch as recited in claim 35, wherein the memory portions are one of clusters and packet descriptors.

40. The network switch as recited in claim 35, wherein the first port is configurable to receive Gigabit Ethernet traffic not using control frame-based flow control.

41. A network switch comprising:

one or more ports configured to receive input packets for the network switch;

a random access memory comprising a plurality of memory portions configured for use In storing packets in the network switch; and packet admission logic coupled between a first port of the one or more ports and the random access memory, wherein the packet admission logic comprises a plurality of threshold groups, wherein each threshold group comprises a plurality of flows, and wherein the packet admission logic is configured to manage allocation of the plurality of memory portions to packets received on the one or more ports and assigned to one of the plurality of threshold groups and one of the plurality of flows within said threshold group using input thresholding;

for each of the plurality of threshold groups, a plurality of registers configured to:

store a total number of memory portions allowed for the threshold group;

store information defining a plurality of levels of operation for the threshold group, wherein the threshold group is configured to operate in one of the plurality of levels from a lowest level to a highest level;

store a maximum number of memory portions allowed for each flow at each operating level of the threshold group, wherein the maximum number of memory portions allowed to each flow ranges from a largest number to a progressively smaller number from the lowest operating level to the highest operating level respectively; and store at least one of a minimum threshold and a maximum threshold for each operating level in the threshold group, wherein the minimum threshold for a level is configured for use in determining If the threshold group is to be changed to a lower operating level after removing one or more previously received packets, and wherein the maximum threshold is configured for use in determining if the threshold group is to be changed to a higher operating level after storing one or more packets.

42. The network switch as recited in claim 41, wherein the registers are programmable registers.

43. The network switch as recited in claim 41, wherein at least one of the one or more ports is configurable to receive Gigabit Ethernet traffic not using control frame-based flow control.

* * * * *

UNITED STATES PATENT AND TRADEMARK OFFICE
CERTIFICATE OF CORRECTION

PATENT NO. : 7,227,841 B2
APPLICATION NO. : 10/144081
DATED : June 5, 2007
INVENTOR(S) : Rodney N. Mullendore et al.

It is certified that error appears in the above-identified patent and that said Letters Patent is hereby corrected as shown below:

Column 13, line 4, delete "18 bit" and insert --18-bit--, therefor.

Column 20, line 52, delete "Levelligh" and insert --LevelHigh--, therefor.

Column 30, line 12, in Claim 9, after "recited" delete "In" and insert --in--, therefor.

Column 30, line 24, in Claim 12, after "threshold" (First Occurrence) delete "group" and insert --groups--, therefor.

Column 30, line 28, in Claim 12, after "level" delete ":" and insert --;--, therefor.

Column 30, line 34, in Claim 12, after "switch" insert --,--.

Column 30, line 62, in Claim 12, after "switch" delete ":" and insert --;--, therefor.

Column 31, line 2, in Claim 13, after "stored" delete "In" and insert --in--, therefor.

Column 31, line 64, in Claim 19, after "and" delete "If" and insert --if--, therefor.

Column 32, line 38, in Claim 24, after "switch" delete "Is" and insert --is--, therefor.

Column 34, line 11, in Claim 30, after "determine" delete "If" and insert --if--, therefor.

Column 34, line 14, in Claim 30, after "packet" delete "In" and insert --in--, therefor.

Column 34, line 16, in Claim 30, after "packet" delete "In" and insert --in--, therefor.

Column 34, line 65, in Claim 35, after "to" delete ";" and insert --:--, therefor.

Column 36, line 20, in Claim 41, after "use" delete "In" and insert --in--, therefor.

UNITED STATES PATENT AND TRADEMARK OFFICE
CERTIFICATE OF CORRECTION

PATENT NO. : 7,227,841 B2
APPLICATION NO. : 10/144081
DATED : June 5, 2007
INVENTOR(S) : Rodney N. Mullendore et al.

It is certified that error appears in the above-identified patent and that said Letters Patent is hereby corrected as shown below:

Column 36, line 52, in Claim 41, after "determining" delete "If" and insert --if--, therefor.

Signed and Sealed this

Twenty-second Day of September, 2009

David J. Kappos
*Director of the United States Patent and Trademark Office*